US005978646A

United States Patent [19]
Weinberg

[11] Patent Number: 5,978,646
[45] Date of Patent: Nov. 2, 1999

[54] METHOD AND APPARATUS FOR SIMULATING A LOFARGRAM IN A MULTIPATH SONAR SYSTEM

[75] Inventor: Henry Weinberg, Waterford, Conn.

[73] Assignee: The United States of America as represented by the Secretary of the Navy, Washington, D.C.

[21] Appl. No.: 08/891,365

[22] Filed: Jul. 10, 1997

[51] Int. Cl.$^6$ ..................................................... G01S 9/00
[52] U.S. Cl. ..................................................... 434/6; 434/7
[58] Field of Search ......................................... 434/6, 7

[56] References Cited

U.S. PATENT DOCUMENTS

| 3,153,770 | 10/1964 | Feistman et al. |
|---|---|---|
| 3,164,659 | 1/1965 | Abrams . |
| 3,311,868 | 3/1967 | Cupp et al. .................................. 434/6 |
| 3,610,798 | 10/1971 | Murphree ..................................... 434/6 |
| 3,676,565 | 7/1972 | Rowe .......................................... 434/6 |
| 3,713,081 | 1/1973 | Murphree ..................................... 367/1 |
| 3,789,128 | 1/1974 | Murphree ..................................... 434/8 |
| 3,829,596 | 8/1974 | Murphree ..................................... 434/6 |
| 3,872,293 | 3/1975 | Green ......................................... 708/821 |
| 4,106,103 | 8/1978 | Perreault ..................................... 708/821 |
| 4,208,732 | 6/1980 | Ruehle ......................................... 367/42 |
| 4,231,103 | 10/1980 | Timm ......................................... 708/404 |
| 4,250,634 | 2/1981 | Buckler ......................................... 434/6 |
| 4,349,915 | 9/1982 | Costas ......................................... 375/267 |
| 4,393,483 | 7/1983 | Hammond et al. ......................... 367/13 |
| 4,446,542 | 5/1984 | Beckerle ..................................... 367/131 |
| 4,562,312 | 12/1985 | Duttweiler ................................. 370/290 |
| 4,667,199 | 5/1987 | Roberts ..................................... 342/169 |
| 4,736,199 | 4/1988 | Chadwick et al. ........................ 345/119 |
| 4,920,521 | 4/1990 | Yoshie ....................................... 367/103 |
| 4,972,379 | 11/1990 | Harris, Jr. ................................. 367/13 |
| 4,973,252 | 11/1990 | Krueger ..................................... 434/6 |
| 5,150,336 | 9/1992 | Sullivan et al. .......................... 367/103 |
| 5,301,167 | 4/1994 | Proakis et al. ............................ 367/134 |
| 5,315,562 | 5/1994 | Bradley et al. ............................. 367/89 |
| 5,422,860 | 6/1995 | Bradley et al. ............................. 367/89 |
| 5,475,651 | 12/1995 | Bishop et al. .............................. 367/88 |
| 5,566,134 | 10/1996 | Dufault ..................................... 367/135 |
| 5,568,450 | 10/1996 | Grande et al. ............................ 367/131 |

Primary Examiner—Jessica J. Harrison
Assistant Examiner—David A Fleming
Attorney, Agent, or Firm—Michael J. McGowan; James M. Kasischke; Prithvi C. Lall

[57] ABSTRACT

A method and apparatus for simulating a lofargram in a multipath sonar system is provided. The invention includes an input means for providing a plurality of simulated sonar system parameters. A defining means is joined to the input means to establish a plurality of eigenrays with terms corresponding to at least one of the simulated sonar parameters. A lofargram means is joined to the defining means for interpolating said eigenrays to produce simulated lofargram output signals. The invention can also incorporate a report means for generating a report from the simulated lofargram output signals.

18 Claims, 26 Drawing Sheets

METHOD AND APPARATUS FOR SIMULATING A LOFARGRAM IN A MULTIPATH SONAR SYSTEM

CROSS-REFERENCE TO RELATED PATENT APPLICATIONS

This patent application is co-pending with four related patent applications entitled METHOD AND APPARATUS FOR SIMULATING REVERBERATION IN A MULTIPATH SONAR SYSTEM U.S. Ser. No. 891,368, METHOD AND APPARATUS FOR SIMULATING A MULTIPATH SONAR SYSTEM U.S. Ser. No. 08/891,369, METHOD AND APPARATUS FOR SIMULATING AUTOCORRELATION COEFFICIENTS IN A MULTIPATH SONAR SYSTEM U.S. Ser. No. 08/891,371, and METHOD AND APPARATUS FOR SIMULATING CROSS-CORRELATION COEFFICIENTS IN A MULTIPATH SONAR SYSTEM U.S. Ser. No. 08/891,372, by the same inventor as this application.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to a method and apparatus for simulating a sonar device and more particularly to an apparatus and method for simulating a multipath sonar system.

(2) Description of the Prior Art

Active and passive sonar systems are well known. An active sonar system generally comprises a transmitter and acoustic transducer that produces a scattering and propagating wave front. A receiving transducer array detects the incidence of a reflected portion of the wave front. Passive sonar systems consist substantially of the receiving transducer array, as the detected object becomes the transmitter either by means of noise from the object or operation of active sonar devices.

Sonar operators must necessarily become familiar with the devices they operate. Part of this training usually includes large amounts of time practicing with simulation devices. Prior simulation devices have generally operated by using wave interpolation models (e.g, models operating according to the spherical spreading law, to ray tracing, or to a wave model) at positions and frequencies of interest or by interpolating the acoustic pressure at the transducer face.

For example, U.S. Pat. No. 3,789,128 to Murphree discloses an active signal generator, a passive signal generator and an echo generator to provide simulated multipath sonar signals. The active signal generator generates a first signal that is divided into two portions. One portion of the signal is delayed and phase shifted and then recombined with another unshifted portion to produce an input signal to an echo synthesizer. The passive generator produces a second signal that likewise is divided into portions with one portion delayed and phase shifted and then combined with the other portion to produce a combined signal. The output of the echo synthesizer and the combined signal from the passive signal generator are then combined to provide signals intended to simulate the characteristics of a multipath sonar signal.

U.S. Pat. No. 4,446,542 to Beckerle discloses an acoustic ocean measuring system that includes several sound pulse emitting floats in an area at determinable positions and several hydrophones for receiving the emitted signals. The system operates by receiving the emitted pulse signals to determine, over a fixed period, peak intensities of the signals received at the hydrophones and then comparing the peak intensities with a predicted peak intensity to indicate anomalies in the area.

U.S. Pat. No. 4,736,199 to Chadwick et al. discloses apparatus for receiving an incident acoustic wave along an array of hydrophones. The received signals are delayed and processed to provide an output representative of the frequency spectrum of the incident wave for various angles of incidence. The processed signals are then accumulated or stacked over time to produce lofargrams for display.

U.S. Pat. No. 5,150,336 to Sullivan et al. discloses a frequency dispersive transmitting array for propagating composite wave energy that emulates narrow-band beams of different frequencies radiated in directions relative to an array of linearly oriented radiating elements. The array of radiating elements is driven by a multi-frequency signal that is time delayed relative to each radiating element. The time delay corresponds to a multiple of the dominant frequency of the period of the signal radiated in a direction broadside to the array. The processing of the emission signal also includes window weighting circuitry to aid in the beam forming of the emitted signals from each of the radiation elements. The frequency of the emitted signal at a target or reflected from the target indicates the bearing angle from the radiation emitters to the target.

Other United States Letters Patent disclose various prior art apparatus or methods for simulating reverberation in multipath sonar systems or overcoming reverberation in multipath environments. For example U.S. Pat. No. 3,713,081 to Murphree discloses a sonar simulator that simulates sonar echoes with Doppler effects characterized by frequency shifts proportional to the transmitted frequencies. The simulator includes apparatus for storing digital representations of sonar signals at a predetermined rate. The apparatus then reads out the signals at a rate determined by a simulated rate of change in the range between the simulated target and receiver. The simulator further includes apparatus for attenuating and echo highlighting the simulated echoes depending on the simulated orientation angles between the target and the receiver.

U.S. Pat. No. 3,829,596 to Murphree discloses an electrical system for simulating sonar reverberation from sonar signals stored in memory. The stored signals replicate sonar signals at differing times corresponding to receipt of scatters from various ranges. A reference amplitude signal generator provides reference signals to adjust the amplitude and number of the replica signals for better representation. The apparatus also includes number generators, logic and comparators to simulate signals along various azimuths for simulation of multi-beam sonar receivers.

U.S. Pat. No. 4,393,483 to Hammond et al. discloses an apparatus for evaluating the performance of a sonar buoy system that includes a generator for generating simulated target information. The simulation section comprises a reverberation simulator, a signal synthesizer, bearing, echo level and sea state controllers, three noise sources, multipliers and summer circuitry. The synthesizer generates seven frequencies with adjustable phase. The generated signals provide bearing and echo characteristics by controlling the amplitude ratios and phase differences between the signals by multiplying the signals by constants. The noise sources generate noise signals that are manipulated and signed with the amplitude and phase multiplied signals to provide a composite signal. Combining the composite signal with the processed generated signals provides a simulated multipath sonar signal.

U.S. Pat. No. 4,972,379 to Harris, Jr. discloses apparatus for simulating reflected sonar signals from under water targets having a transmitter which broadcasts sonar signals through a given current of water toward a receiver. The simulator includes first and second sawtooth wave generators with the frequency of the second output greater than the first output. The output of the first generator is amplitude, voltage, and duration adjustable according to a predetermined simulated target. The output of the second generator and the adjusted outputs of the first generator are combined to produce a composite signal representing a preselected target length, aspect and range and a second composite signal representing target aspect, length, range and shadow lengths. The second composite signal is converted to a third composite signal containing target range, length, a shadow length and highlights. The output of the second generator is also selectively gated and used to generated a simulated reverberation signal corresponding to the gating rate. This reverberation signal and the second composite signal are combined to produce a fourth composite signal that in turn is combined with the second composite signal to produce a fifth composite signal that represents a simulated multipath sonar signal.

U.S. Pat. No. 5,301,167 to Proakis et al. discloses an underwater acoustic communication system that enables high data transfer rates by use of feed-forward and feed-back equalizers, sample clocking, and doppler compensation. The system uses coherent phase modulation and demodulation of the received signals to overcome the reverberation and other multipath characteristics of underwater transmissions.

Other prior art apparatus can produce lofargrams in a multipath sonar simulator. For example the previously cited Chadwick et al. U.S. Pat. No. (4,736,199) discloses apparatus for receiving and processing hydrophonic signals. The circuitry accumulates the signals in data blocks that represent lofargrams.

U.S. Pat. No. 4,964,408 to Chittineni discloses a process for tomographic development of seismic section data produced by a seismic source and receivers having known positions. Forward modeling provides estimated time travel intervals for the seismic waves travelling from the source to the receivers. The area between the source and receiver are divided into two dimensional cells with associated velocity coefficients. Ray tracing utilizing the estimated travel time, position orientation used to derive a travel parameter estimation of seismic travel time.

Still other prior art apparatus can produce autocorrelation coefficients. U.S. Pat. No. 3,676,565 to Rowe discloses a method of synthesizing time domain wave forms from frequency domain data with improved resolution in middle and lower frequencies for use as a sonar simulator. The disclosed method separates sensed frequency signals into predetermined frequency bins. The frequency bins are then Fourier transformed by using inverse or fast Fourier transforms to obtain time domain data. Adding the time domain data of each of the groups in corresponding times provides a composite time domain wave form.

U.S. Pat. No. 4,562,312 to Duttweiler discloses a method for estimating the delay in a communication circuit by subsampling incoming and outgoing signals to obtain a cross-correlation between the incoming and the outgoing signals to adjust a delay circuit to cancel echoes in the communication circuit.

U.S. Pat. No. 4,920,521 to Yoshie discloses apparatus for interpolating delay periods in transmitted ultrasonic signals and producing therefrom delay time data supplied to delay circuits. A predetermined delay time added to the interpolated delay time modifies the timing of transmission of ultrasonic signals and is also used in delaying ones of received signals being passed to summing circuits for summation with other received signals.

Yet other apparatus can produce a cross-correlation of received signals. As one example, U.S. Pat. No. 3,872,293 to Green discloses apparatus for performing time and space Fourier transform processing of optical signals from a sonar array. The process includes modulating coherent light with signals from an array of acoustic signals generated by hydrophones. After Fourier transform processing of the generated signals, transformed signals are mapped to produce an optical space model of the acoustic array.

U.S. Pat. No. 4,106,103 to Perreault discloses apparatus employing an automatic equalizer to calculate an equalization transfer function for received signals and perform the equalization within a frequency domain. Overlapping moving window samples are employed together with discrete Fourier transforms and inverse discrete Fourier transforms to provide an equalized time domain output signal.

U.S. Pat. No. 4,208,732 to Ruehle discloses apparatus for receiving seismic information signals from spaced receivers that are successively time shifted to provide a plurality of reference traces. The apparatus cross-correlates the reference traces with the individual seismic information signals to produce a correlation function to enhance the primary reflection signals within the seismic information signals.

U.S. Pat. No. 4,231,103 to Timm discloses a spectral analysis system with a fast Fourier transform processor that receives a time domain signal from a sonar receiver. The spectral analysis system estimates the signal strengths at discrete intervals for a frequency domain. Each of the time estimated signal strengths equals the frequency domain coefficients of the fast Fourier transform of the time domain signal generated when the time domain signal is sampled at a number of intervals equal to the number of initial estimates. A spectral recorder receives the adjusted estimates and records the frequency components of the time domain signal and relative strengths thereof.

U.S. Pat. No. 4,349,915 to Costas discloses apparatus for reproducing transmitted information signals that are subject to multipath delay spread effects and doppler frequency shift effects. The apparatus sequentially shifts the nominal frequencies of successively received pulses through a plurality of frequencies to determine the frequencies to which the transmitted pulses are doppler shifted and the multipath delays of each pulse. The frequency and delay information enables the reproduction of the actual transmitted information signals from the arrival pulses.

U.S. Pat. No. 4,562,312 to Duttweiler is previously described. It uses a delay circuit to cancel echo signals in the received signal.

These methods for simulation of sonar receivers suffer from various drawbacks. For example, those simulators that rely upon the spherical spreading laws do not and cannot mimic or simulate the acoustic phenomena, such as focusing and shadows, associated in actual multipath sonic environments. Simulators based upon ray modeling tend to be efficient but do not produce acceptable results in the demarcation of areas, often called caustics, that separate shadows and focussed regions in the simulated environment. To counter this limitation ray model simulators use factors that attempt to correct for the sounds transmitted in the caustic region. However, such prior art corrections have been highly inefficient in simulations when lower frequency signals are involved and when the simulated environment varies in range and azimuth.

Prior art simulators that rely on generation of wave models are generally inefficient at frequencies corresponding to sonar systems. They fail to adequately simulate multipath data and to enable simulation of reverberation. Additionally, wave model simulators for simulating passive sonar systems fail to reproduce the acoustic pressures of hundreds of frequencies with sufficient accuracy and efficiency. Large numbers of frequencies are necessary for producing sufficient simulated data to produce autocorrelation, lofargram and cross-correlation analysis necessary to simulate a passive sonar receiver. Due to the rapid fluctuation usually associated with actual sonar systems, prior art attempts to interpolate the acoustic pressures over various frequencies have proven to be unrealistic and inefficient.

Thus, the prior art fails to provide a method and apparatus that simulates in a relatively accurate manner a multipath sonar device, including, for example, enabling simulation of reverberation, lofargrams, autocorrelation coefficients and cross-correlation coefficients in a multipath sonar system. Some of the prior art devices even require actual sound emitting devices and hydrophone arrays. This defeats the purpose of seeking a relatively low cost and convenient multipath sonar system simulator.

SUMMARY OF THE INVENTION

Therefore, it is an object of this invention to provide a low-cost simulator for generating signals corresponding to multipath sonar signals.

Another object of this invention is to provide a simulator for generating signals corresponding to multipath sonar signals that is convenient to use.

Still another object of this invention is to provide a simulator for generating diverse signals that simulate diverse characteristics of multipath sonar signals.

Yet another object of this invention is to provide, by simulation, a report in the form of a lofargram of simulated multipath sonar signals.

Apparatus for simulating a lofargram in a multipath sonar system includes devices for providing input signals simulating sonar system parameters and an eigenray generator for defining a plurality of eigenrays having terms corresponding with the parameters of the input signals. The apparatus includes a processor for interpolating from the defined eigenrays, responsive to the simulated parameters to produce simulated lofargram output signals.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
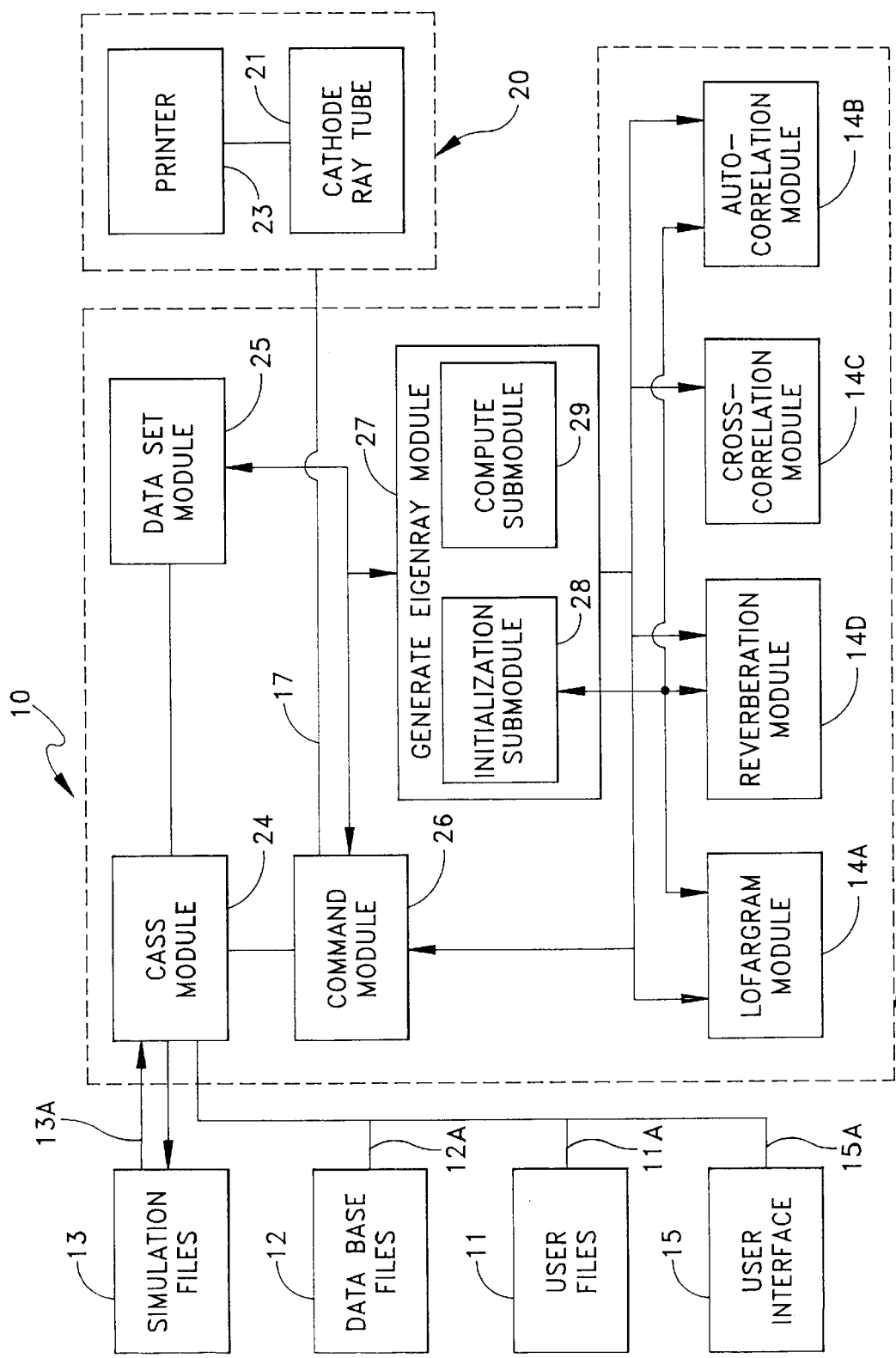
FIG. 1 is a block diagram of a multipath sonar system according to this invention.

A sonar simulator system 10 according to an embodiment of this invention as depicted in FIG. 1 includes a plurality of input devices, such as data storage devices 11, 12 and 13 that store user, data base and simulation files, respectively. The user, data base and simulation files from the data storage devices 11, 12 and 13 provide information signals 11A, 12A and 13A, respectively, for initializing a processing module 14. A user interface 15 generates user interface signals 15A. These signals collectively enable the processing module 14 to produce simulated sonar response signals 17 that drive a report generator 20 to provide a desired report. The report generator 20 may include a CRT display 21 to produce a graphical display a printer 23 to produce a printed report or a similar device or combination thereof.

The processing module 14 includes a Comprehensive Acoustic Sonar Simulator (CASS) module 24, a data set module 25, a command module 26, and a generate eigenray module 27 that includes an initialize sub-module 28 and a compute sub-module 29. This module connects to an array of other modules including a lofargram module 14A, an autocorrelation module 14B, a cross-correlation module 14C and a reverberation module 14D. In general, the processing module 14 responds to the input signals 11A, 12A, 13A and 15A by multiplying or otherwise combining eigenrays with sonar system parameters to simulate sonar system operation and produce outputs such as lofargrams, autocorrelation functions, cross-correlation functions and reverberations. More specifically, the processing module 14 receives data base files from the data storage device 12 with sets of computed eigenrays (hereinafter "primary eigenrays") that are manipulated by interpolative and extrapolative techniques to produce the simulated output of a multipath sonar system.

The CASS module 24 receives signals 11A, 12A, 13A and 15A and is the primary element of the processing module 14.

Figure 2:
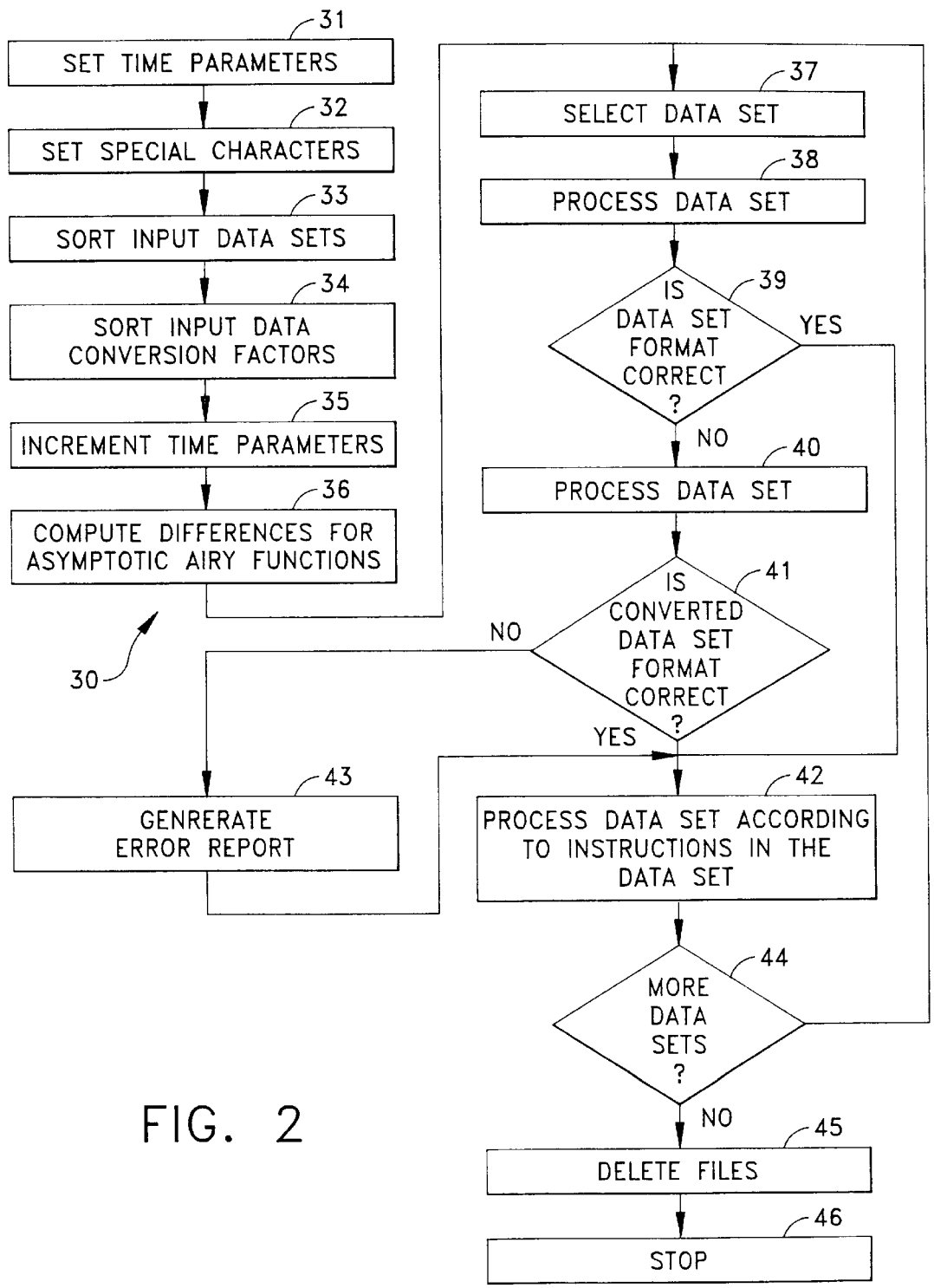
FIG. 2 is a flow diagram of a CASS module process of FIG. 1.
Figure 3:
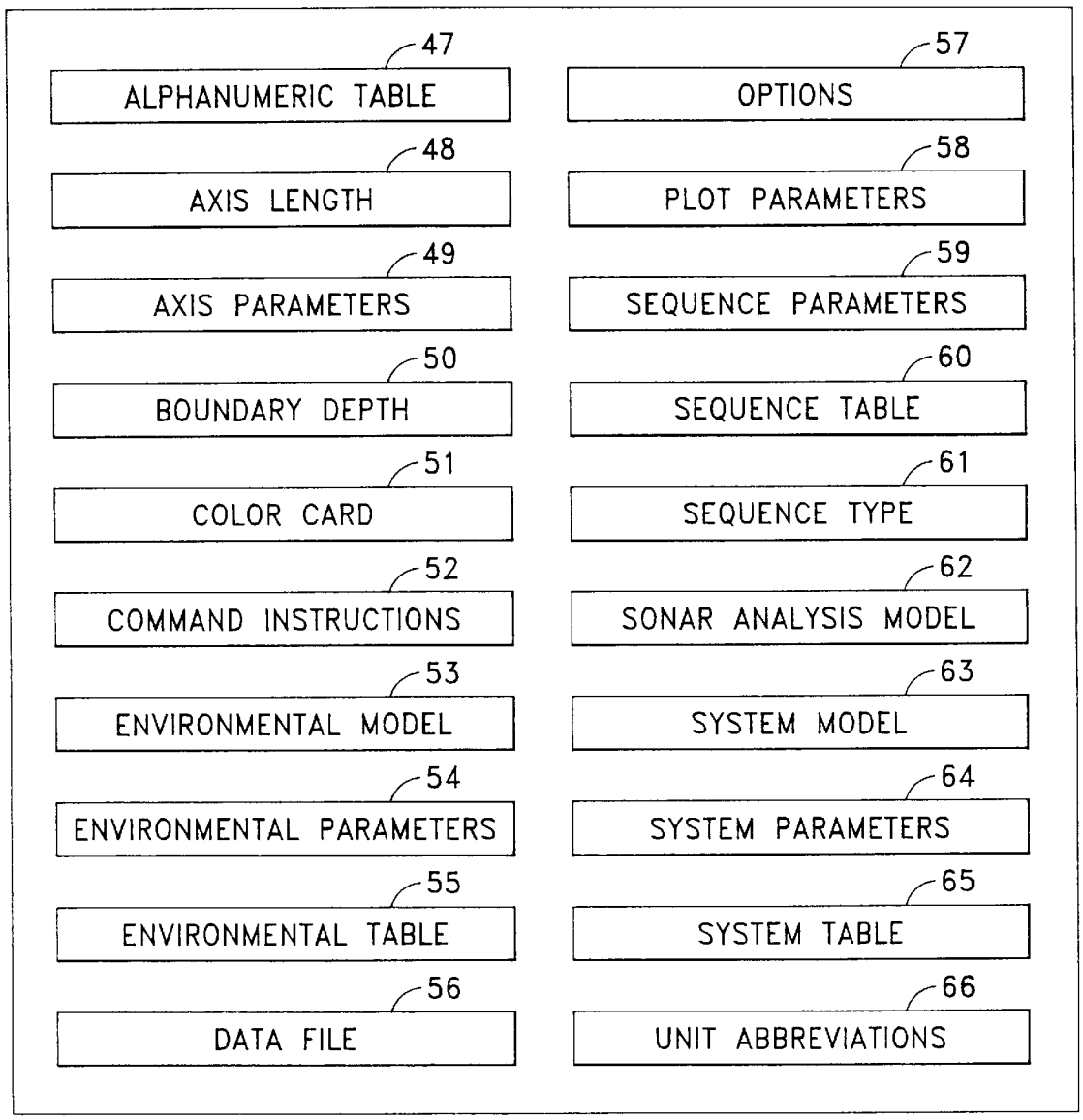
FIG. 3 depicts subroutines that operate in response to operations established by FIG. 2.

Typically, the CASS module 24 will comprise a digital computer programmed to operate according to FIG. 2 to process data sets in accordance with any of a plurality of specific processes or situations shown in FIG. 3. The process begins with an initialization sequence in FIG. 2 that includes setting time parameters in step 31, setting special characters in step 32, sorting the input data sets by their instruction types according to a predetermined order in step 33, sorting input data conversion factors by external units and storing for later use in step 34, incrementing time parameters in step 35 and computing differences for asymptotic Airy function forms in step 36.

After completing the initialization sequence 30, step 37 selects an individual set in its sorted order and processes that data set in step 38. The processing step 38 enables the data set module 25 and, if appropriate, the command module 26 to implement a series of steps as will be discussed hereinafter. After processing an individual data set, step 39 tests the format of the data set. If the format is not correct, step 40 attempts to convert the data set to a correct format. If the conversion is successful, step 41, that tests the converted data set, transfers control to step 42 that processes the data set as described later. If the conversion is not successful, step 41 diverts to generate an error report in step 43. After step 42 or step 43 is completed, step 44 determines whether additional data sets require processing. If additional data sets exist, control passes back to step 37. Once all data sets are processed, step 45 deletes temporary files and the process terminates in step 46.

As previously indicated, there are different data sets that are processed differently. FIG. 3 depicts a plurality of subroutines 47 through 66 for acting on a data set during step 42 of FIG. 2. Each of the processors or subroutines in FIG. 3, except for subroutine 52, is well known in the art.

Figure 4:
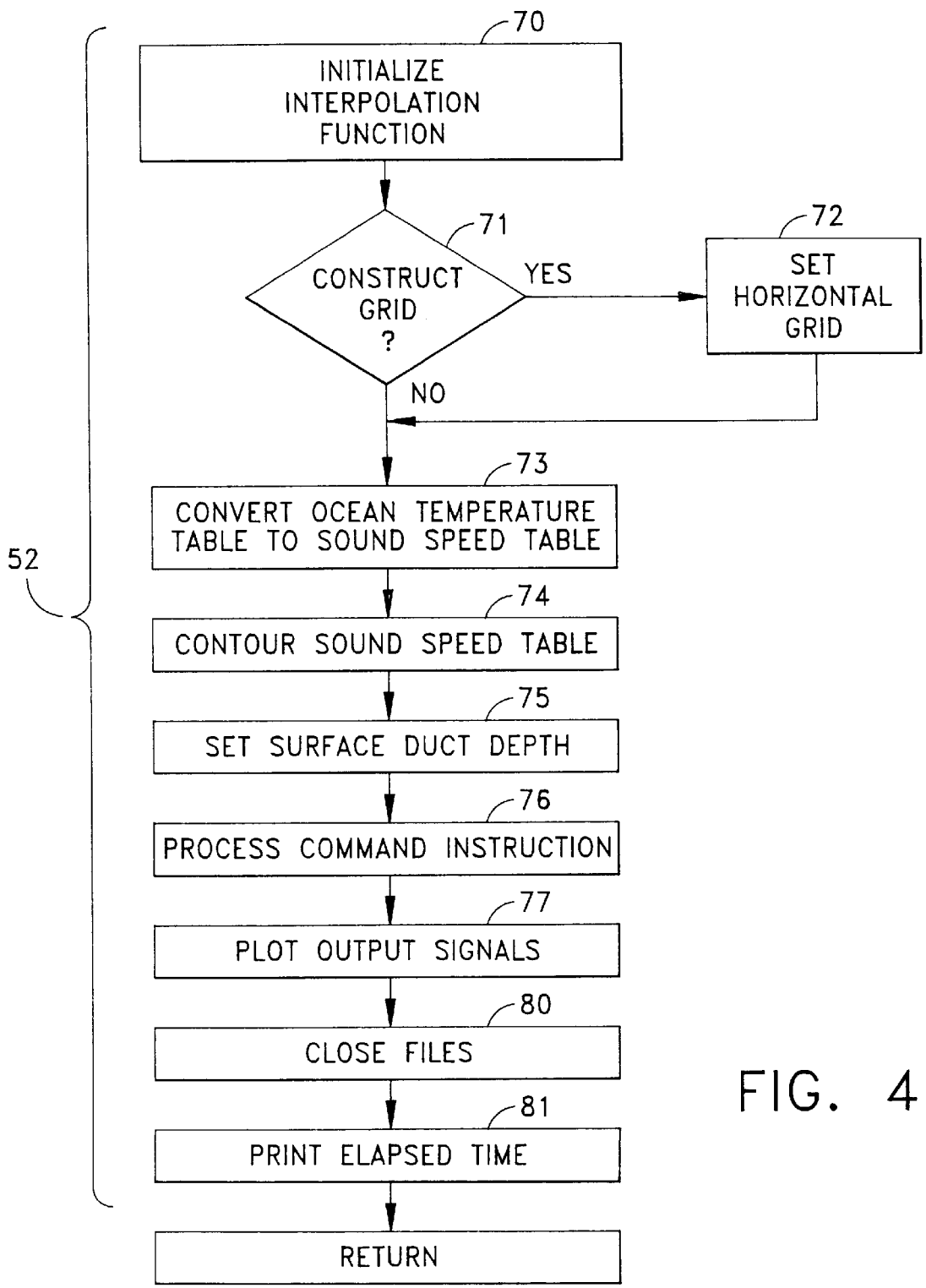
FIG. 4 is a flow diagram of a command module process of FIG. 1.

FIG. 4 depicts the command instructions subroutine 52 in more detail. Step 70 initializes interpolation functions for X, Y and Z variables in space by interpolation of the data set. The decision step 71 reads the command instruction set to determine whether step 72 should form a horizontal grid representing the multipath environment. In either event, step 73 converts an ocean temperature table to a sound speed table, and step 74 contours the speed of sound in the volume being analyzed accordingly. Step 75 sets the surface duct depth for the data set. Step 76 comprises one of a plurality of command processes according to the command instruction set of the data set being processed. This step calls a plurality of processing routines such as the lofargram, reverberation, autocorrelation and cross-correlation routines detailed hereinafter. After step 76, step 77 produces any relevant plot or other output. Step 80 closes the open data set and step 81 determines the elapsed time at the end of the instruction set. Once a command instruction is processed, control reverts to step 39 of FIG. 2.

Figure 5:
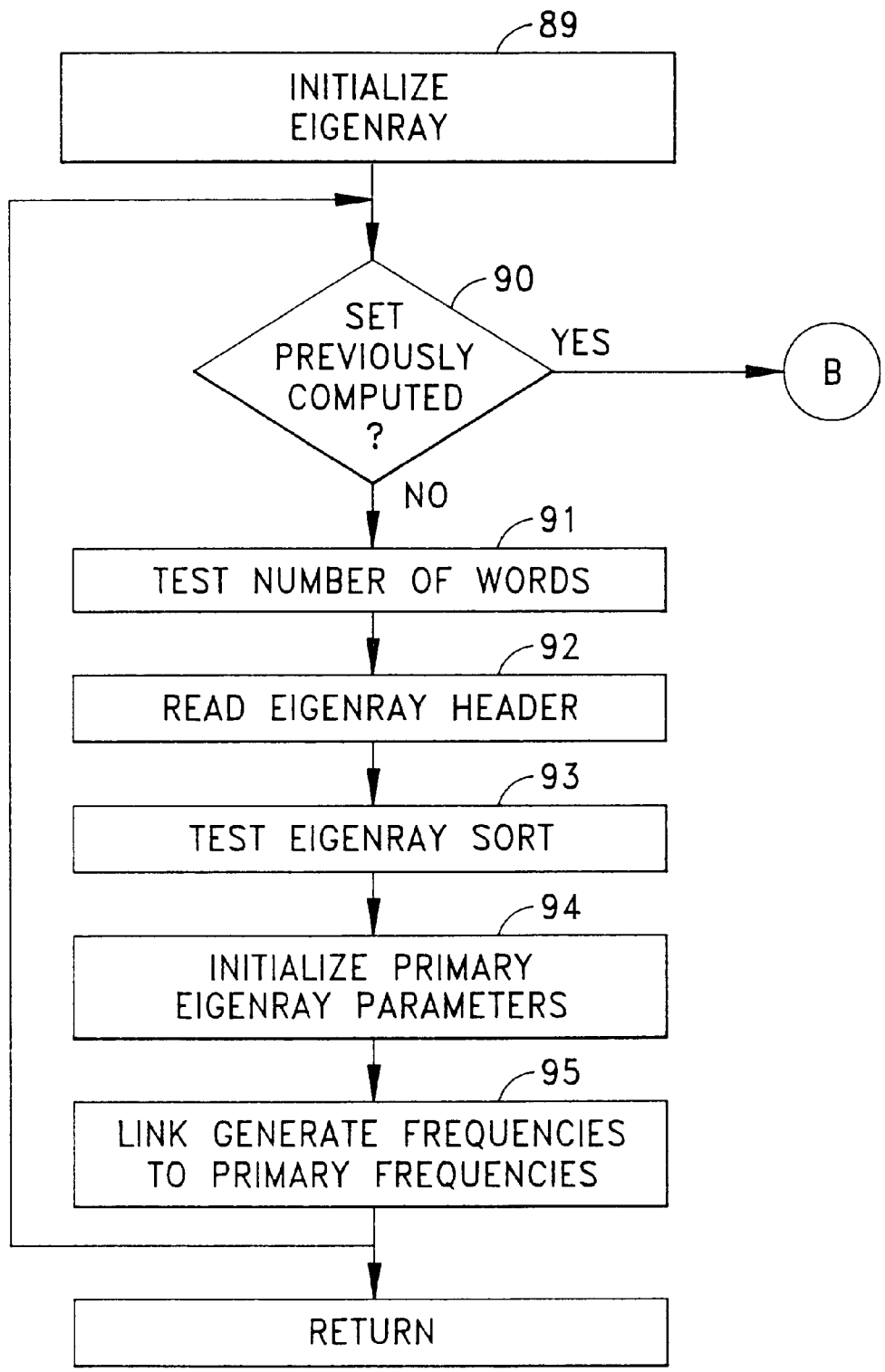
FIG. 5 is a flow diagram of an initialize sub-module of a generate eigenray module of FIG. 1.
Figure 6:
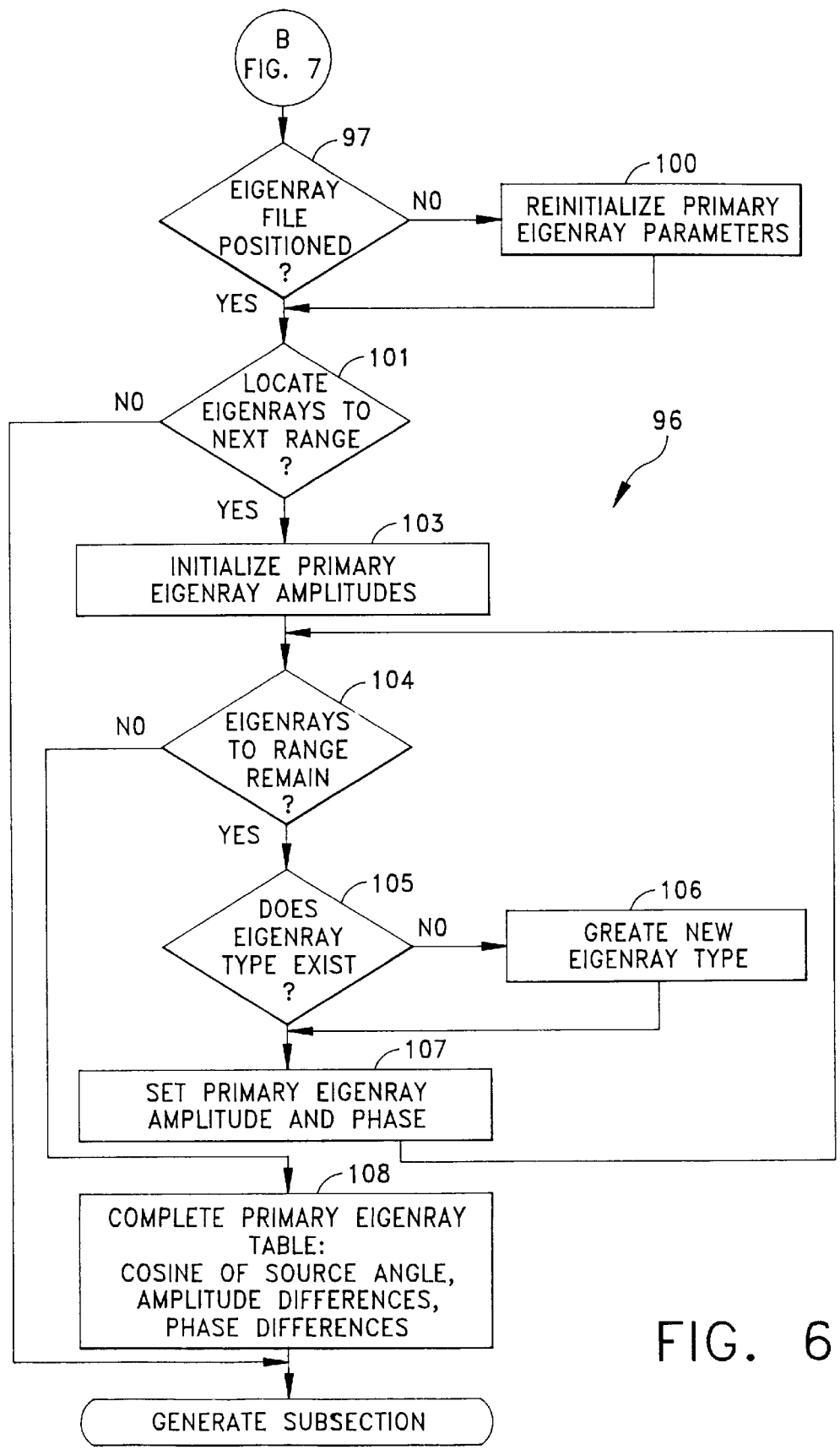
FIGS. 6 and 7 are flow diagrams of a compute sub-module of the generate eigenray module of FIG. 1.
Figure 7:
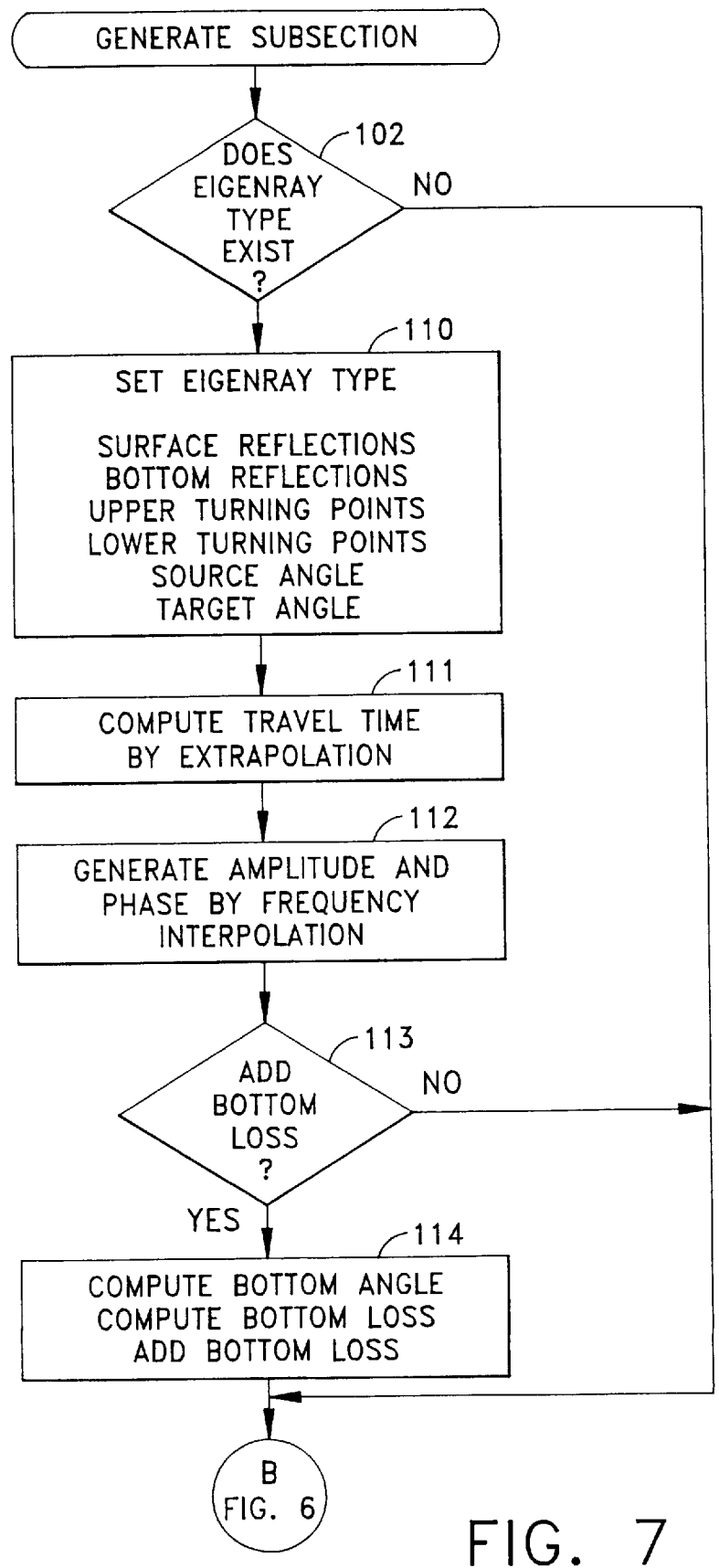

FIGS. 5, 6 and 7 constitute a flow diagram of the processes used by the generate eigenray module 27 of FIG. 1 to generate eigenrays for use in this invention. The generation of the eigenrays commences upon enablement with operation of the initialization sub-module 28 of FIG. 1. Primary eigenrays in this instance are provided during an initialization step 89 from one of the data bases 11, 12 and 13 of FIG. 1. Alternatively, the initialization of step 89 can be accomplished by methods such as a fast multipath expansion method as disclosed and discussed in Henry Weinberg, "Application of Ray Theory to Acoustic Propagation in Horizontally Stratified Oceans", Journal of the Acoustic Society of America, volume 58, No. 1, 1975, pp. 97–109 and Henry Weinberg, "Effective Range Derivative for Acoustic Propagation Loss in a Horizontally Stratified Ocean", Journal of the Acoustic Society of America, volume 70, No. 6, 1981, pp. 1736–1742.

Each eigenray used by this invention has a defined number of eigenray words corresponding to the number of frequencies and a header indicating the total number of upper and lower reflection and turning points defined by the eigenray. Turning points are points at which rays are refracted in the opposite depth direction. Moreover, the simulation data base 13 of FIG. 1 provides data sets for ranges between a simulated sonar source and a simulated sonar receiver, numbers of generated frequencies received by the simulated receiver and the frequencies thereof, and numbers of upper and lower turning points (collectively called "eigenray type index").

After initialization, step 90 determines whether a particular set of eigenrays has been previously computed. If not, step 90 transfers control to a sequence of steps 91 through 95. Step 91 tests the number of words in each of the eigenrays. Step 92 reads the eigenray header. Steps 93 through 95 test an eigenray sort, initialize primary eigenray parameters and link generated frequencies to primary frequencies, respectively.

More specifically, step 95 links the simulated or generated frequencies with the frequency components of the selected eigenrays by the following ratio:

$$frgrat_g(ifrq_g) = \frac{\log\left[\frac{frq_g(ifrq_g)}{frq_e(ifrq_1)}\right]}{\log\left[\frac{frq_e(ifrq_2)}{frq_e(ifrq_1)}\right]} \quad (1)$$

Where the term "$ifrq_g$" represents the generated frequencies from 1 through n where n is the number of frequencies and the terms "$ifrq_1$" and "$ifrq_2$" index adjacent primary frequencies that bound the term "$frq_g (ifrq_g)$".

Once the frequencies have been linked, control returns to step 90 for transfer to a procedure 96 in FIG. 6 provided by the compute sub-module 29 in FIG. 1. Step 97 of FIG. 6 tests the position of the eigenray files and either reinitializes the primary eigenrays in step 100 or employs the previously determined eigenray file. In either case, step 101 determines whether the eigenrays have a primary range "$rng_c$" that is close to the generated range "$rng_g$". The variable "$rng_c$" is a user entered variable, and "$rng_g$" is a computer generated variable. That is, the primary range index "$rng_p$" is the range for which:

$$|rng_g - rng_e(irng_p)| \quad (2)$$

is a minimum. Step 101 determines whether the eigenray table generated and accessed is appropriate with respect to the range provided by the simulated data. If the primary range index "$rng_p$" is within a predetermined level, step 101 enables step 102 of a "Generate Subsection" module of FIG. 7. Otherwise step 103 initializes the primary eigenray amplitudes for the eigenrays having the primary range characteristics from the set of eigenrays to create a new eigenray table. Step 104 determines if any eigenrays remain to be processed. If they do, step 105 determines whether the index of the eigenray $ityp_p$ matches the index of the simulation. If not, step 106 creates a new eigenray type with the appropriate turning points and frequency components. Step 107 sets the primary eigenray amplitude and phase and returns to step 104.

Once all the eigenrays in the table are processed, step 104 transfers control to step 108 that completes the primary eigenray table by inserting the cosine of the source angle, "srcang$_p$", relative to the simulated sonar receiver:

$$\text{cossrc}_p(\text{ityp}_p) = \cos[\text{srcang}_p(\text{ityp}_p)] \quad (3)$$

and accounts for the differences between adjacent frequency amplitudes and phases by the following equations:

$$\text{ampdel}_p(\text{ityp}_p, \text{ifrq}_e) = \text{ampeig}_p(\text{ityp}_p, \text{jfrq}_e) - \text{ampeig}_p(\text{ityp}_p,) \quad (4)$$

$$\text{phsdel}_p(\text{ityp}_p, \text{ifrq}_e) = \text{phseig}_p(\text{ityp}_p, \text{jfrq}_e) - \text{phseig}_p)\text{ityp}_p, \text{ifrq}_e) \quad (5)$$

for $$\text{ityp}_p = 1, 2, \ldots \text{ntyp}_p;$$

$$\text{ifrq}_e = \text{jfrq}_e - 1; \text{ and}$$

$$\text{jrfq}_e = 2, 3, \ldots, \text{nfrq}_e. \quad (6)$$

When the procedure of FIG. 6 is completed, control transfers to step 102 in FIG. 7 to determine whether a proper eigenray type exists within the existing eigenray table. If not, the processing of the command is completed in FIG. 5 and control reverts to step 76 of FIG. 4. If it does exist, step 110 in FIG. 7 sets an eigenray type by establishing frequency independent components with the exception of travel time. These components include the source and target information angles, number of surface and bottom reflections, upper and lower turning points, and the imaginary ray index to those of the primary eigenray from data supplied by the simulation data base of FIG. 1. The travel time, timeig$_g$, is then extrapolated by step 111 along the primary range to the generated range according to:

$$\text{deltim}_g = \frac{[rng_g - rng_e(irng_p)]}{srcssp_e} \quad (7)$$

and $$\text{timeig}_g = \text{timeig}_p(\text{ltyp}_g) + \text{deltim}_g \text{cossrc}_p(\text{ltyp}_g) \quad (8)$$

An interpolation step 112 then generates the frequency dependent amplitude and phase parameters by logarithmic interpolation with respect to frequency using:

$$\text{ampeig}_g(\text{jfrq}_g) = \text{ampeig}_p(\text{ltyp}_g, \text{jfrq}_1) + \text{frqrat}_g(\text{jfrq}_g) \text{ampdel}_p(\text{ltyp}_g, \text{jfrq}_1) \quad (9)$$

$$\text{phseig}_g(\text{jfrq}_g) = \text{phseig}_p(\text{ltyp}_g, \text{jfrq}_1) + \text{frqrat}_g(\text{jfrq}_g) \text{phsdel}_p(\text{ltyp}_g, \text{jfrq}_1) \quad (10)$$

If necessary step 113 determines if bottom loss should be added to the eigenray. A bottom loss step 114 computes the bottom angle and the amplitude of the loss from such turning points. These values are then subtracted from the appropriate eigenray amplitudes.

Accordingly, as will be understood by those in the art, the range dependence for the simulated applications according to this invention are small compared to the time dependence. Consequently the process of FIG. 7 extrapolates travel time with respect to range, although all other components are locally independent of range. This avoids any excess computation that would be required to match corresponding eigenray types at adjacent ranges. It will also be understood that the bottom loss due to the travel of the simulated waves is added to the eigenray amplitude after the frequency interpolation to avoid cases when bottom reflection coefficients vary rapidly with frequency.

The lofargram module 14A in FIG. 1 defines a lofargram, that is, a display of the frequency response of acoustic pressure waves as a function of elapsed time. The lofargram module 14A responds to signals from the generate eigenray module 27 as described above in connection with FIGS. 5 through 7. The lofargram module 14A uses and employs a simulated Closest Point of Approach, or CPA, between the simulated target and the simulated receiver to provide an efficient simulation method for producing the lofargram. A CPA Index denotes the time segment at which CPA occurs.

Figure 8:
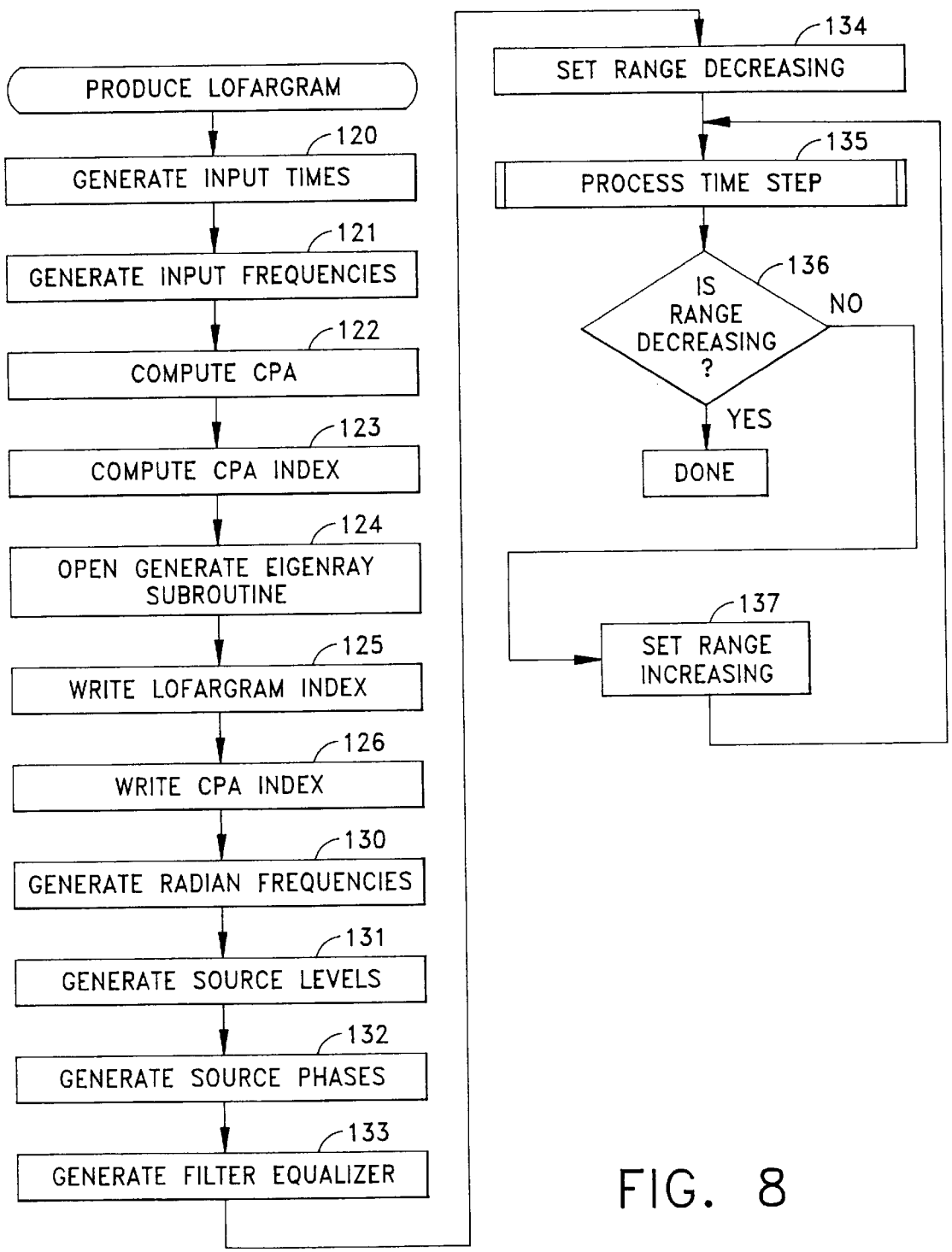
FIG. 8 is a flow diagram of a lofargram module process of FIG. 1.

FIG. 8 depicts the operation of the lofargram module 14A that begins on receipt of a command by the command module 26 of FIG. 1 indicating that a lofargram is to be generated. Steps 120 and 121 in FIG. 8 generate input times and frequencies from the simulation data base 12. The CPA and CPA Index are then computed in steps 122 and 123. Step 124 enables the generate eigenray module 27 of FIG. 1 by calling step 90 through 95 of FIG. 5 before enabling step 125.

Steps 125 and 126 write a lofargram header and the CPA Index to temporary memory. Completion of the initialization of the lofargram module 14A includes generation of radian frequencies by multiplying the input frequencies by $2\pi$ in step 130. Steps 131 and 132 generate source level and source phase derived from the received acoustic wave. Step 133 generates filter equalizer signals based upon signal-to-noise ratios. Step 134 sets the time interval when the target range is decreasing (i.e. the period prior to CPA). A process time step 135 is exercised twice, first for the time interval in which the target range is decreasing and for the time interval in which the target range is increasing, each being separated at the CPA time index. Thus, after the completion of the step 135 during a given iteration, step 136 enables step 137 to repeat step 135 for the period if the target range is increasing. Otherwise step 136 returns control to step 76 of FIG. 4.

Figure 9:
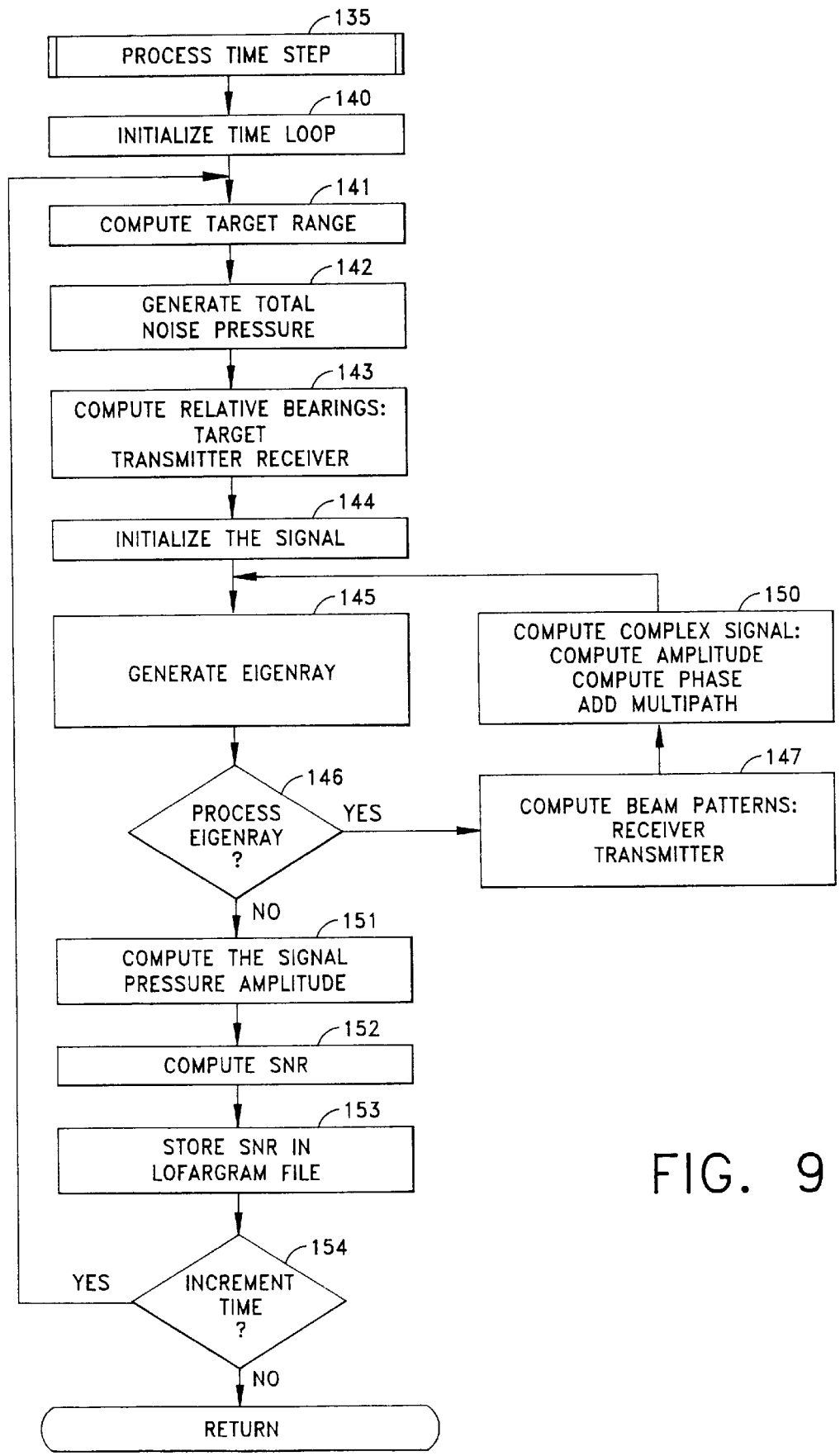
FIG. 9 is a flow diagram of a step in the process of FIG. 8.

The process time step 135 includes a plurality of individual steps depicted in FIG. 9. Step 140 establishes a time loop for the time interval. Step 141 computes a target range for each time increment. Step 142 generates a total noise pressure while step 143 computes the relative bearings of the simulated target transmitter and receiver. After initialization of the signal in step 144, step 145 calls the generate eigenray module 27 (FIG. 1) and performs the steps 96 through 113 (FIGS. 6 and 7) before transferring to step 146. The generate eigenray module 27 of FIG. 1 preferably reads the eigenray data from the eigenray file generated by step 124 of FIG. 8 in order of increasing range to minimize disk access time. Consequently, it is preferred that each successive time increment in the first implementation of step 135 be earlier while in the second implementation of step 135 it is preferred that each successive time increment be later.

The generate eigenray module 27 of FIG. 1 thus supplies a table of eigenrays having amplitudes and phases at all of the simulated lofar frequencies, travel times, launch angles and arrival angle types. The relative bearing angles determined by step 143 are used to compute transmitter and receiver beam patterns in step 147 provided that step 146 determines that processing is appropriate. The eigenray will not be processed if beam patterns and complex signal have already been computed or such computations are unnecessary. Step 150 then calculates a complex signal by multiplying the eigenray amplitudes by the beam patterns and coherently summing individual contributions at each frequency.

Once all the primary eigenrays are processed, step 146 shifts control to step 151 to modify the amplitude of the complex signal in accordance with a source level and filter equalizer. Step 152 computes the signal-to-noise ratio (SNR) by dividing the signal pressure amplitude by the total noise and a system loss factor provided by the simulated data. The computed SNR is stored in step 153 in a lofargram file before the incrementing time step 154. If the time is not incremented a loop has been completed and step 136 (FIG. 8) is enabled. This commences the second pass with step 137 or completes the processing and enables a return to step 76 of FIG. 4.

The autocorrelation module 14B (FIG. 1) responds to primary eigenrays from the generate eigenray module 27 of FIG. 1 to compute autocorrelation coefficients for display in a desired format. Typically the module 14B will be adapted to obtain simulated autocorrelation coefficients by diverse methodologies.

Figure 10:
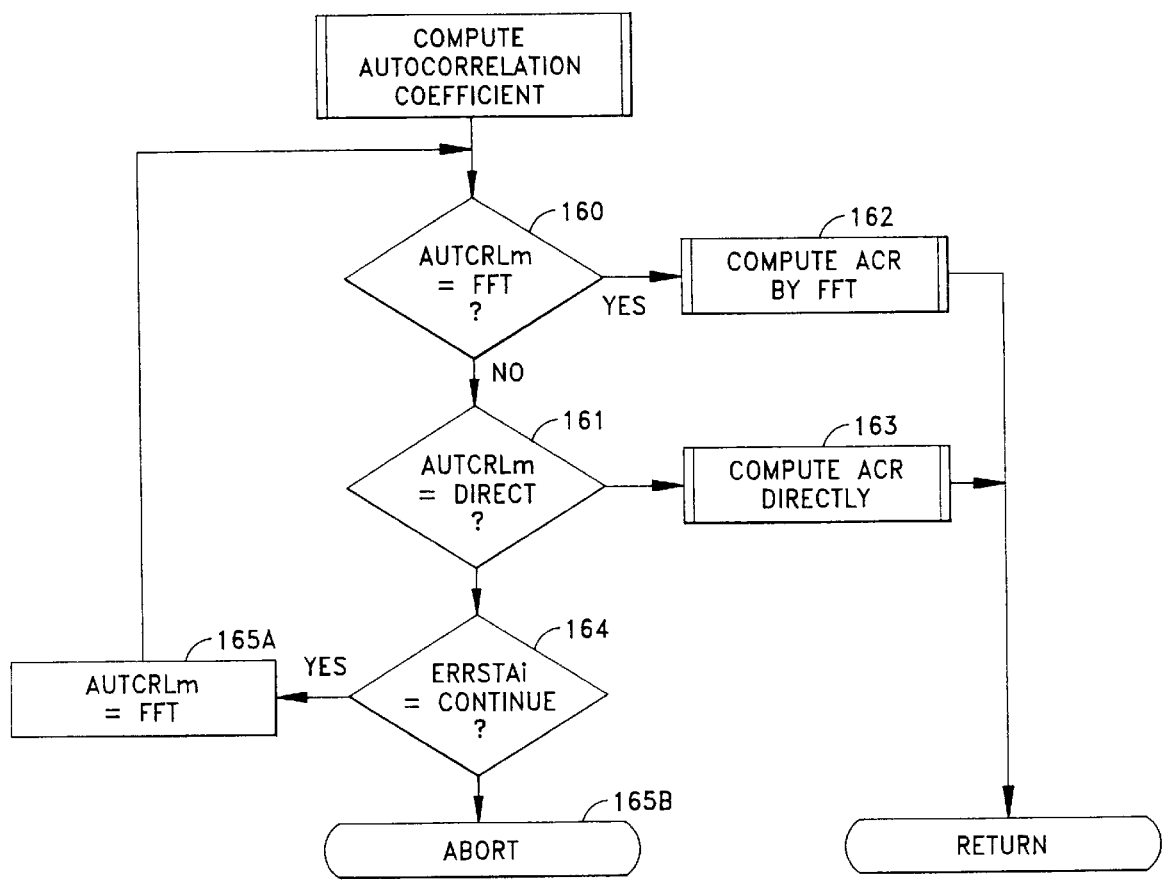
FIG. 10 is a flow diagram of a autocorrelation module process of FIG. 1.
Figure 12:
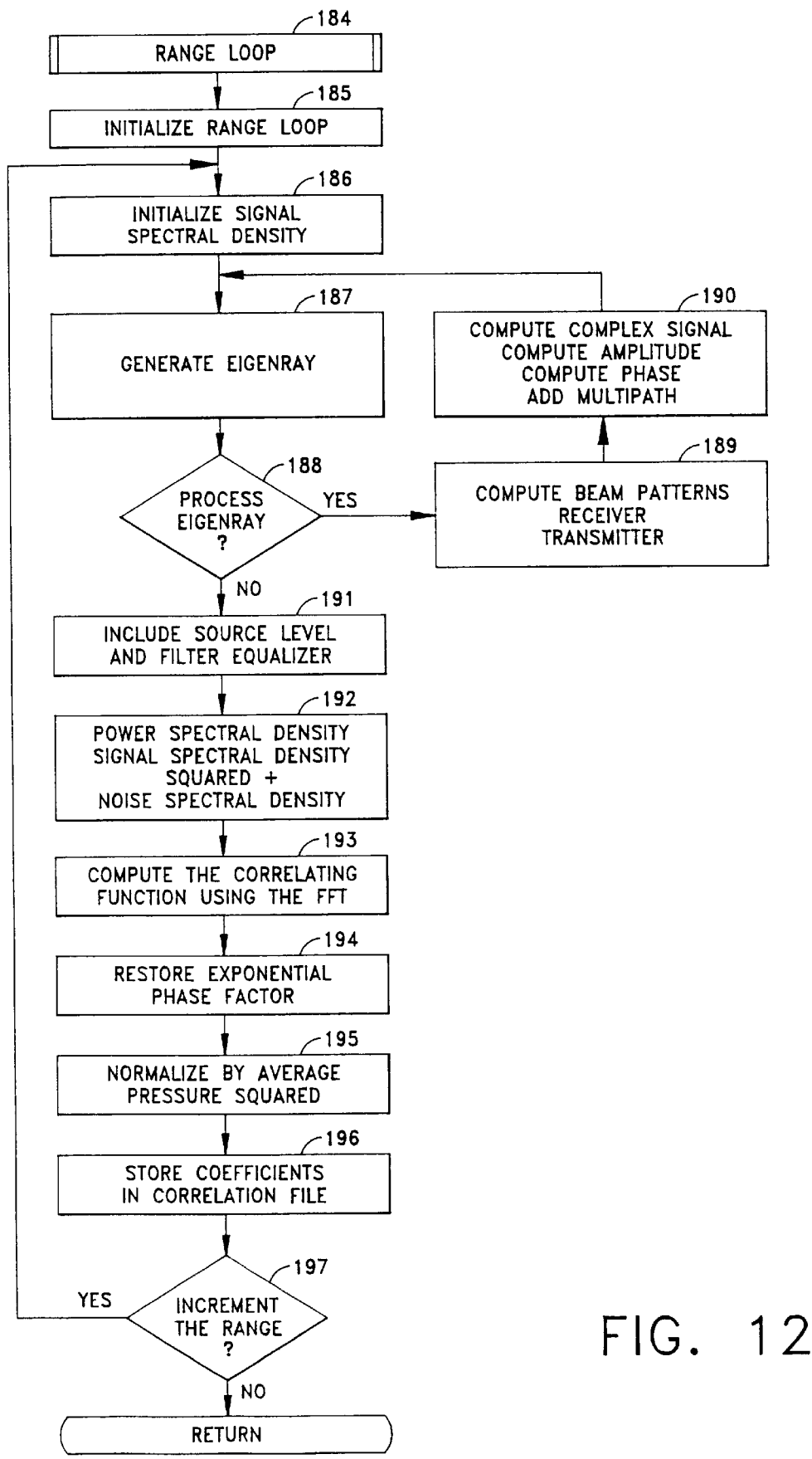
Figure 13:
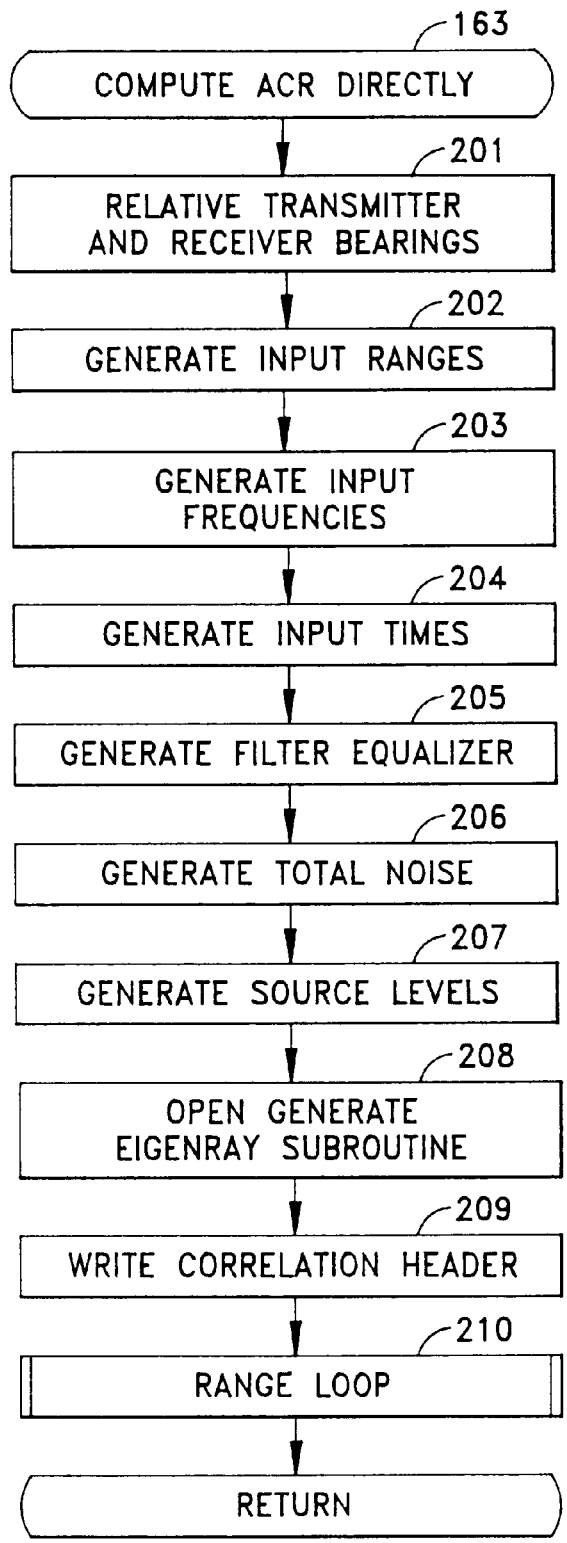
FIGS. 13 and 14 are a flow diagram of another step in the process of FIG. 10.
Figure 14:
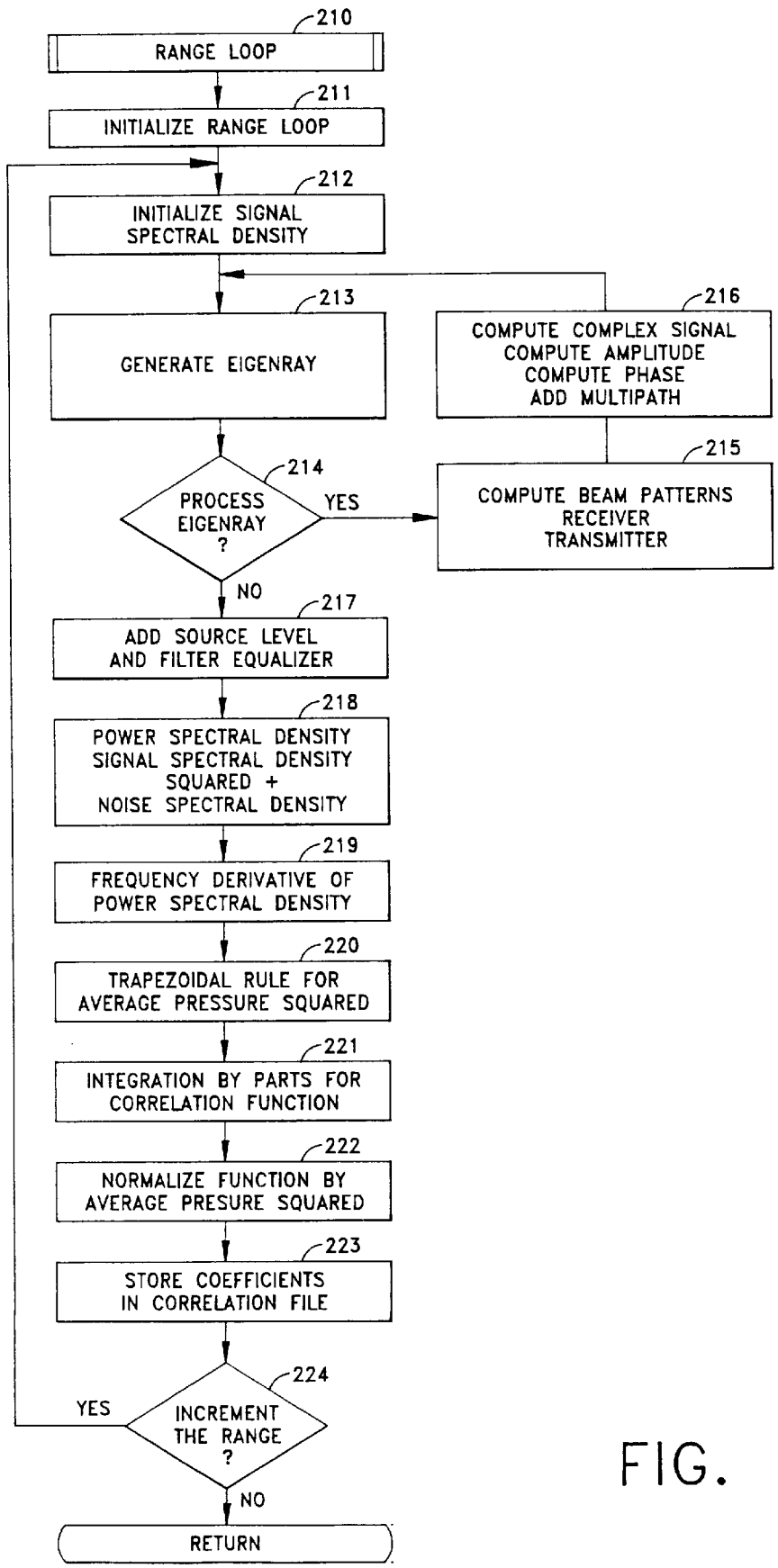

In this embodiment when the instruction set calls for a computation of an autocorrelation coefficient begins in step 76 of FIG. 4, the autocorrelation module 14B performs the process depicted generally in FIG. 10 and in greater detail in FIGS. 12 through 14. Steps 160 and 161 represent decoding procedures for selecting one of the diverse methodologies. For example, if a command defines a Fast Fourier Transform methodology, step 160 transfers control to procedure 162 that initiates the corresponding procedure. If a direct numerical integration is defined step 161 diverts to procedure 163 to call a corresponding subroutine. When evaluation is not indicated by either step 160 or step 161, step 164 enables the user to continue evaluation by a Fast Fourier Transform process in step 165A or to abort the process in step 165B.

In either steps 162 or 163 autocorrelation coefficients for various delay times $\tau$ are calculated by dividing inverse Fourier transform of the total acoustic spectral density, $crl_f(\tau)$, by the average pressure squared, $crl_f(0)$. At $\tau=0$, $$sp_{tot}^2(frq) = crl_f(0) \quad (11)$$

That is:

$$crl_c(\tau) = \frac{crl_f(\tau)}{crl_f(0)} \quad (12)$$

where $$crl_f(\tau) = 2R\left[\int_{frq_{min}}^{frq_{max}} sp_{tot}^2(frq)e^{2\pi i frq\tau} d(frq)\right] \; (\mu Pa^2) \quad (13)$$

and $$sp_{tot}^2(frq) = sp_{sgn}^2(frq) + sp_{nse}^2(frq)\left(\frac{\mu Pa^2}{hz}\right) \quad (14)$$

and $crl_c$=autocorrelation coefficient (power ratio)
$crl_f$=autocorrelation function ($\mu Pa^2$)
frq=frequency (hz)
$frq_{min}$=minimum frequency (hz)
$frq_{max}$=maximum frequency (hz)
$sp_{nse}^2$=noise spectral density ($\mu Pa^2$/hz)
$sp_{sgn}^2$=signal spectral density ($\mu Pa^2$/hz)
$sp_{tot}^2$=total spectral density ($\mu Pa^2$/hz)
$\tau$=delay time The noise spectral density is given by:

$$sp_{nse}^2(frq) = [totnse_v(frq)]^2 \quad (15)$$

while the signal spectral density $$sp_{sgn}^2(frq) = [spc_{sgn}(frq)]^2 \quad (16)$$

which is obtained from the complex valued pressure spectral density that is the coherent sum over all eigenrays to the range of interest by:

$$spc_{sgn}(frq) = \sum_{m=1}^{neig} spc_{eig}(m, frq)e^{\{2\pi i frq[t-timeig_v(m)] - iphseig_v(m,frq)\}} (\mu Pa/hz^{0.5}) \quad (17)$$

where $$spc_{eig}(m) = ampeig_v(m) * srclvl_v(frq) * flteql_v(frq)trnbmp_v\{trnbrn + srcang_v(m)frq\}rcvbmp_v\{rcvbrn - trgang(m)\} \quad (18)$$

where $$trnbrn = trgbrn_i - srchdg_i \quad (19)$$

and $$revbrn = tgbrn_i - trghdg_i + \pi \quad (20)$$

and $srchdg_i$=true source heading (radians)
$trghdg_i$=true target heading (radians)
$trgbrn_i$=true target bearing (radians)
$rngrfr_i$=range (km) at which the relative pressure is referenced
neig=number of eigenrays computed
$srcang_v$=vertical angle (radians) at the source
$trgang_v$=vertical angle (radians) at the target
$timeig_v$=travel time of the eigenray(s)
$ampeig_v$=eigenray amplitude (pressure ratio // range reference)
$phseig_v$=phase shift (radians) due to boundary interactions, caustics, etc . . .
$flteql_v$=filter equalizers (voltage ratio)
$rcvbmp_v$=receiver beam pattern (voltage ratio)
$srclvl_v$=source level ($\mu Pa/hz^{0.5}$ // range reference)
$totnse_v$=total noise spectrum ($\mu Pa/hz^{0.5}$)
$trnbmp_v$=transmitter beam pattern (pressure ratio)

Figure 11:
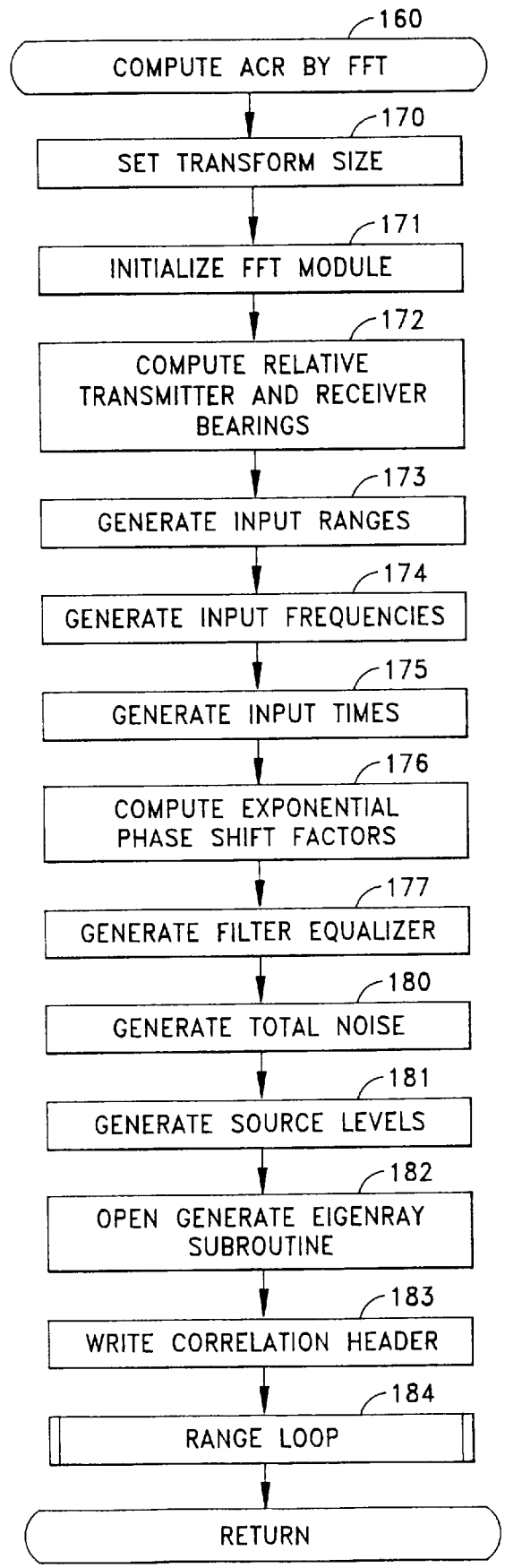
FIGS. 11 and 12 are flow diagrams of a step in the process of FIG. 10.

FIGS. 11 and 12 depict the fast Fourier transform autocorrelation process of procedure 162 that begins by setting the transform size, initializing the FFT and computing the transmitter and receiver bearings in steps 170, 171 and 172, respectively. Steps 173, 174 and 175 generate input images, input frequencies and input times, respectively, from the simulation data. Step 176 computes an exponential phase shift factor while step 177 generates a filter equalizer. Total noise and source levels are generated in steps 180 and 181. Step 182 enables the generate eigenray module 27 of FIG. 1 to perform steps 90 through 95 of FIG. 5 for generating a plurality of eigenrays. Step 183 writes a correlation header.

Procedure 184 comprises a series of steps as depicted in FIG. 12 as range loop 184. Step 185 initializes the range loop. In each iteration of the range loop, step 186 sets the spectral density for a particular range within the range loop. A generate eigenray step 187 calls step 97 of FIG. 6 and begins the computation of the eigenray table as previously discussed with respect to FIGS. 6 and 7. Step 188 determines whether an eigenray based on existing data or user indication should be processed. If so, step 189 computes the beam patterns for the receiver and transmitter and step 190 computes complex signal amplitude phase and add the multipath components, respectively. These steps are repeated for each eigenray in the eigenray table. When all eigenrays in the eigenray table have been processed, step 188 enables step 191 so as to include the source level and filter equalizer from the steps 177 and 181 of FIG. 11. Step 192 then computes a power spectral density which is equal to the signal spectral density squared added with the noise spectral density. Step 193 evaluates the discrete Fourier transform:

$$crl(\tau) = 2(frq_{max} - frq_{min}) \qquad (21)$$

$$R\left[e^{(2\pi i frq_{min}\tau)} * \frac{1}{nfft} \sum_{frq-frq_{min}}^{frq_{max}} sp_{tot}^2 e^{(2\pi i (frq - frq_{min})\tau)}\right]$$

by means of the Markel FFT algorithm as described in Markel, "FFT Pruning", IEEE Audio Electroacoust., vol. AU-19, no. 4, pp. 305–311 (1971).

The simulated data must include the minimum and maximum frequencies, $frq_{min}$, and $frq_{max}$ with a frequency increment, $frq_{del}$, given by:

$$frq_{del} = \frac{(frq_{max} - frq_{min})}{nfft} \qquad (22)$$

The term "nfft" represents the size of the FFT with the corresponding delay time parameters given by the following:

$$max_{lim} = nfft \qquad (23)$$

$$\tau_{min} = 0.0 \qquad (24)$$

$$\tau_{del} = \frac{1.0}{(frq_{max} - frq_{min})} \qquad (25)$$

$$\tau_{max} = (max_{lim} - 1)\tau_{del} \qquad (16)$$

so that the delay time parameters depend on the frequency parameters.

After the computation of the correlation function in step 193, the correlation function is restored by an exponential phase factor in step 194 and normalized by the average pressure squared in step 195. The resulting autocorrelation coefficients are stored in an autocorrelation file in temporary memory by step 196. Step 197 determines whether there are remaining ranges within the range loop defined by step 185, and if so, step 186 is re-enabled. Otherwise control reverts to step 76 in FIG. 4.

The alternative, numerical integration procedure 163 of FIG. 10, like the procedure 162, involves a plurality of steps. FIGS. 13 and 14 depict these steps commencing with step 201 in FIG. 13 where relative transmitter and receiver bearings are computed or accessed from the simulated data. Steps 202 through 207 generate various inputs from the simulated data including input ranges, input frequencies, input times, filter equalization, total noise, and source levels, respectively. Step 208 enables the generate eigenray module 27 of FIG. 1 to perform steps 90 through 95 of FIG. 5 to generate eigenrays for use by a range loop procedure 210. Step 209 writes a correlation header for storing the generated eigenray files and then enables the range loop procedure 210 shown in detail in FIG. 14.

Referring to FIG. 14, the range loop procedure 210 of the numerical integration procedure begins with a range loop initialization in step 211 and the initialization of signal spectral density in step 212. Step 213 computes eigenrays from the generated eigenrays by calling the compute eigenray module 28 of FIG. 1 and enabling the steps beginning with step 96 of FIGS. 6 and 7, as previously described. Step 214 determines whether the eigenray table generated by the eigenray step 213 should be processed depending on user input and existing data, and if so, steps 215 and 216 are enabled. Step 215 computes beam patterns for the receiver and transmitter; step 216 computes complex signal amplitude and phase and adds multipath components, respectively. Each eigenray in the table is processed before control passes to step 217. Step 217 adds the source level and filter equalizer values from steps 205 and 207 of FIG. 13 to the processed eigenray values. Step 218 calculates a power spectral density which equals the signal spectral density squared plus the noise spectral density. The calculated power spectral density is then used to derive a frequency derivative from the power spectral density ($dsp^2$) in step 219. Step 220 employs the trapezoidal rule to find an average pressure squared. Other methods such as Romberg's method, Simpson's method and the like can be used for this purpose. The correlation function is then found in step 221 using piecewise linear segments to approximate the total spectral density and then integrating the resulting transform by part according to:

$$crl(\tau) = \frac{2}{(2\pi\tau)^2}\left[\sum_{i_{frq}=2}^{n_{frq}}\{dsp^2(i_{frq} - 1) - dsp^2(i_{frq})\cos(i_{frq} - 1)\} + \qquad (27)\right.$$

$$dsp^2(n_{frq})\cos(n_{frq} - 1) +$$

$$\left. 2\pi\tau\{sp_{tot}^2(n_{frq})\sin(n_{frq}) - sp_{tot}^2(1)\sin(1)\}\right]$$

where $n_{frq}$ is the number of frequencies, and $$dsp^2(i_{frq}) = \frac{sp_{tot}^2(i_{frq}) - sp_{tot}^2(i_{frq} - 1)}{frq(i_{frq}) - frq(i_{frq} - 1)} \qquad (28)$$

$$\cos(i_{frq}) = \cos[2\pi frq(i_{frq})\tau] \qquad (29)$$

$$\sin(i_{frq}) = \sin[2\pi frq(i_{frq})\tau] \qquad (30)$$

The correlation function is then normalized by the average pressure squared in step 222 and the coefficients are stored in the correlation file in temporary memory by step 223. Step 224 is then called to determine whether the range needs to be incremented within the loop. If not, step 224 reverts to step 76 of FIG. 4. Otherwise the process returns to step 212 for the new incremental range change.

The frequency and time sequence parameters used by the procedure 163 of FIG. 10 are input specified during initialization of the program. This does not occur in procedure 162.

The autocorrelation module 14B uses either procedures 162 or 163 to output two signals: namely, one which shows the autocorrelation coefficients for one range versus time delay along the vertical and horizontal axes, respectively, and the other which displays the autocorrelation coefficient at multiple ranges for various time delays. Since typical autocorrelation predictions use thousands of frequencies, the process of determining phase pressure levels by using a generated eigenray model for autocorrelation coefficients provide an efficient and effective method for simulating autocorrelation coefficients and saves significant computer time.

The cross-correlation coefficient module 14C of FIG. 1 provides interpolation of eigenrays to simulate the cross-correlation functions produced by a multipath sonar system. The cross-correlation coefficient module 14C employs first and second sets of primary eigenrays at primary ranges and frequencies for each of a first pair of a target and receiver and a second pair of a second target and receiver. The cross-correlation module 14C computes spectral densities for each of the pairs to enable determination of simulated cross-correlation coefficients. The cross-correlation coefficient module 14C also generates signals for the report generator 20 to display the simulator cross-correlation coefficients in a desired format.

Figure 15A:
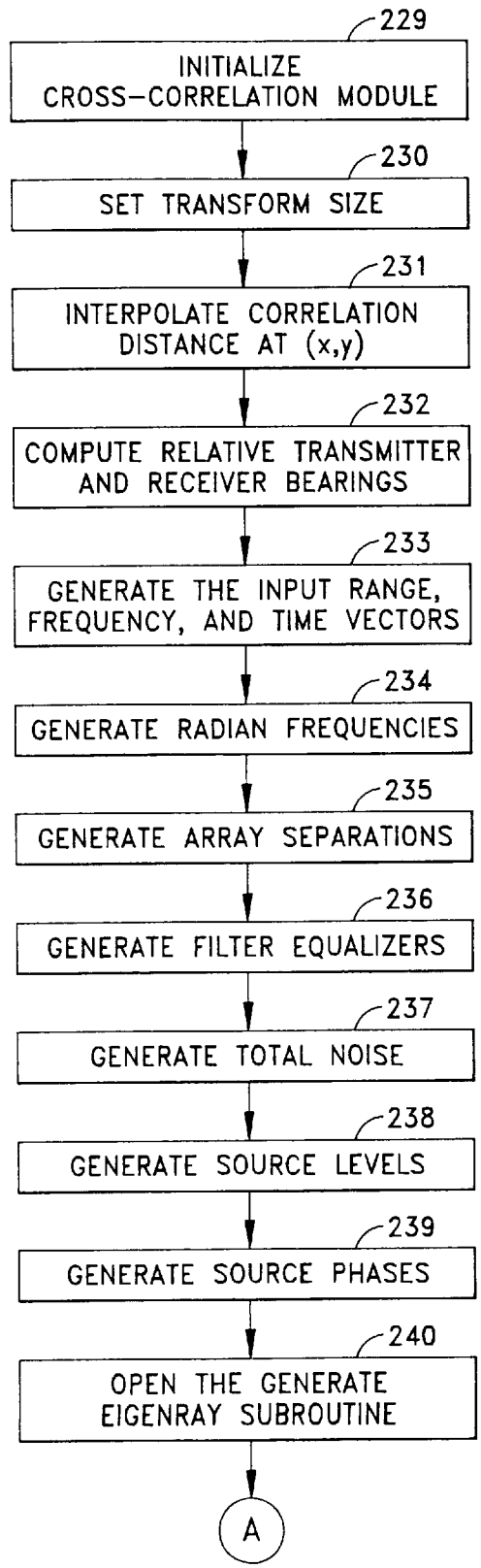
FIGS. 15A through 15B constitute a flow diagram of a cross-correlation module process of FIG. 1.
Figure 15B:
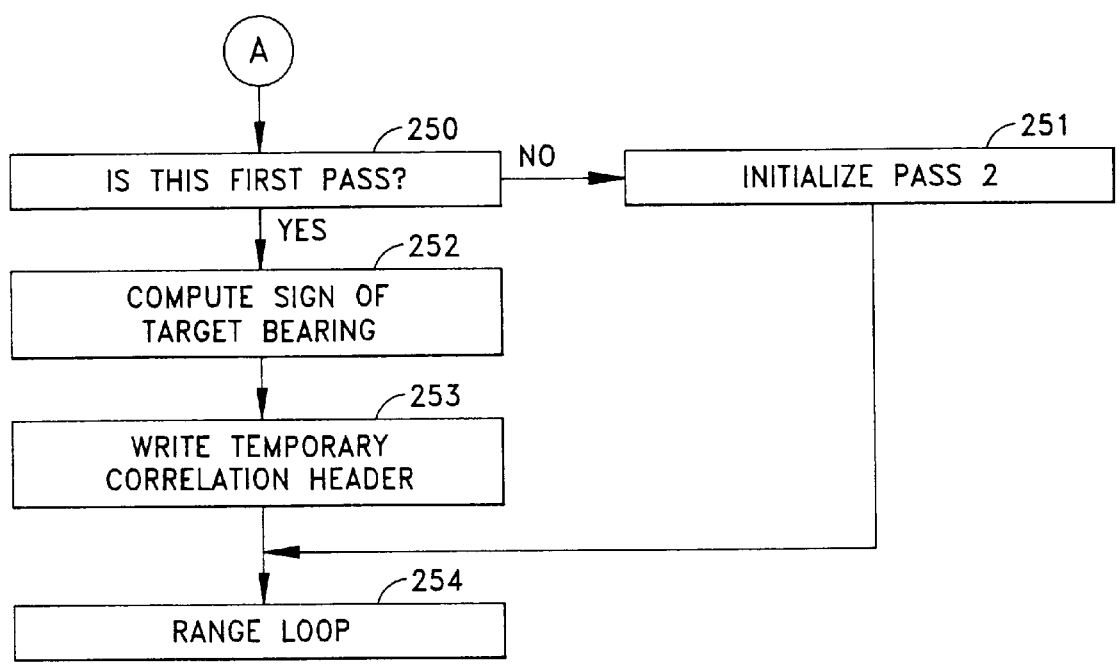

The cross-correlation coefficient module 14C employs a plurality of steps depicted in FIGS. 15A and 15B, 16A and 16B, 17 and 18A through 18D to compute the cross-correlation coefficients when a data set for computing the cross-correlation coefficients is received by the step 76 of FIG. 4. The process commences with an initialization step 229 of FIG. 15A and step 230 that sets the transform size. Step 231 interpolates the correlation distance for the first target and receiver. Step 232 then computes the relative bearings for the transmitter and receiver. The procedure in FIG. 15A then generates the input range, frequency and time vectors in step 233, radian frequencies in step 234, array separations in step 235, filter equalizers in step 236, total noise in step 237, source levels in step 238 and source phases in step 239. Step 240 then calls the generate eigenray module 27 of FIG. 1 to enable steps 90 through 95 of FIG. 5. Thereafter control transfers to step 250 (FIG. 15B).

Step 250 of FIG. 15B determines whether this is a first pass of the initialization process (steps 230 through 240). If not, step 250 enables a second pass step 251 as more fully described hereinafter. If step 250 determines that this is a first pass, step 252 computes the sign of the target bearing. Step 253 then writes a temporary correlation header for the correlation file and then initiates a range loop procedure 254 of the cross-correlation module as shown in FIG. 16A.

Figure 16A:
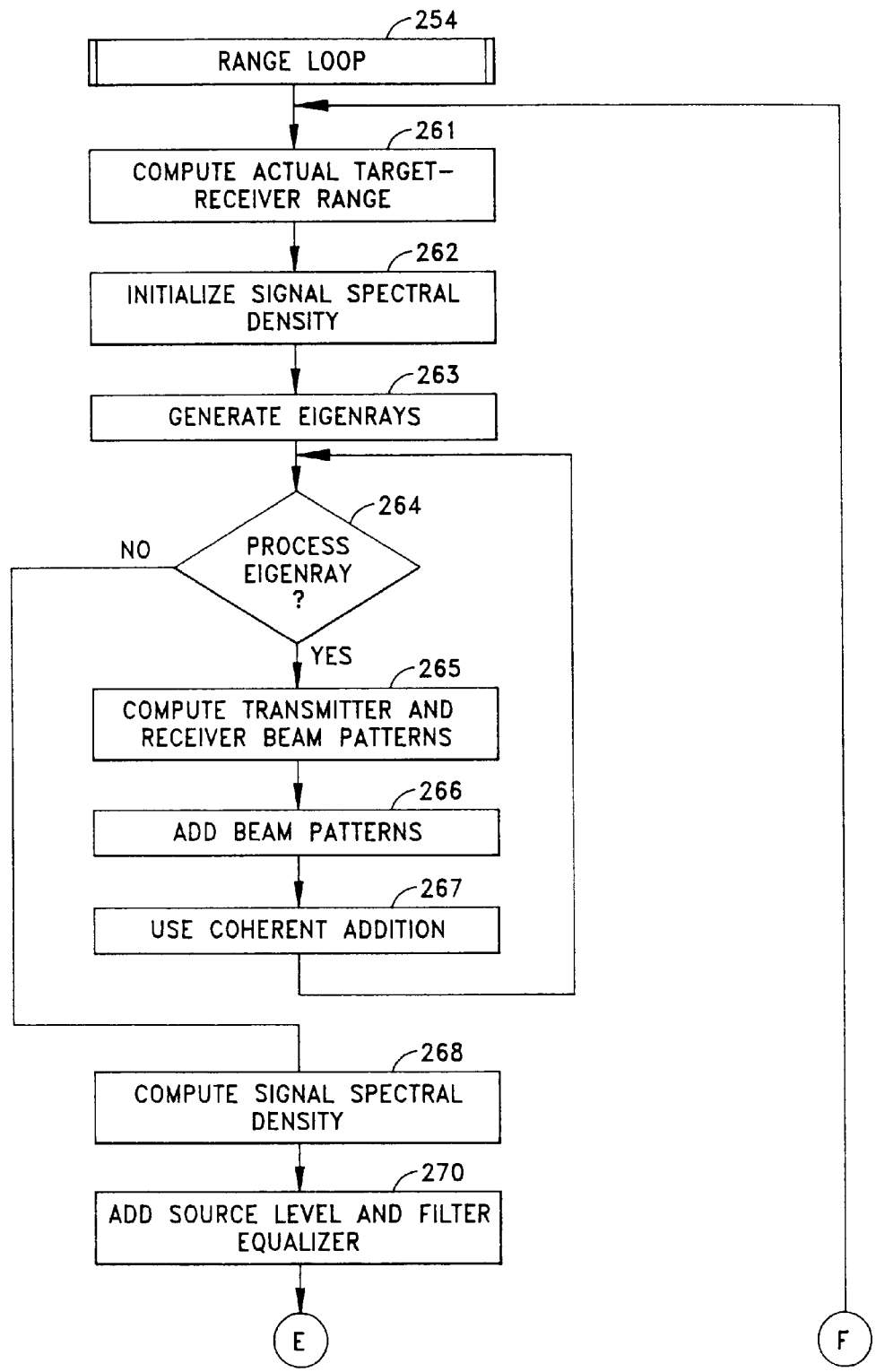
FIGS. 16A through 16B constitute a flow diagram of a step in the process of FIG. 15B.
Figure 16B:
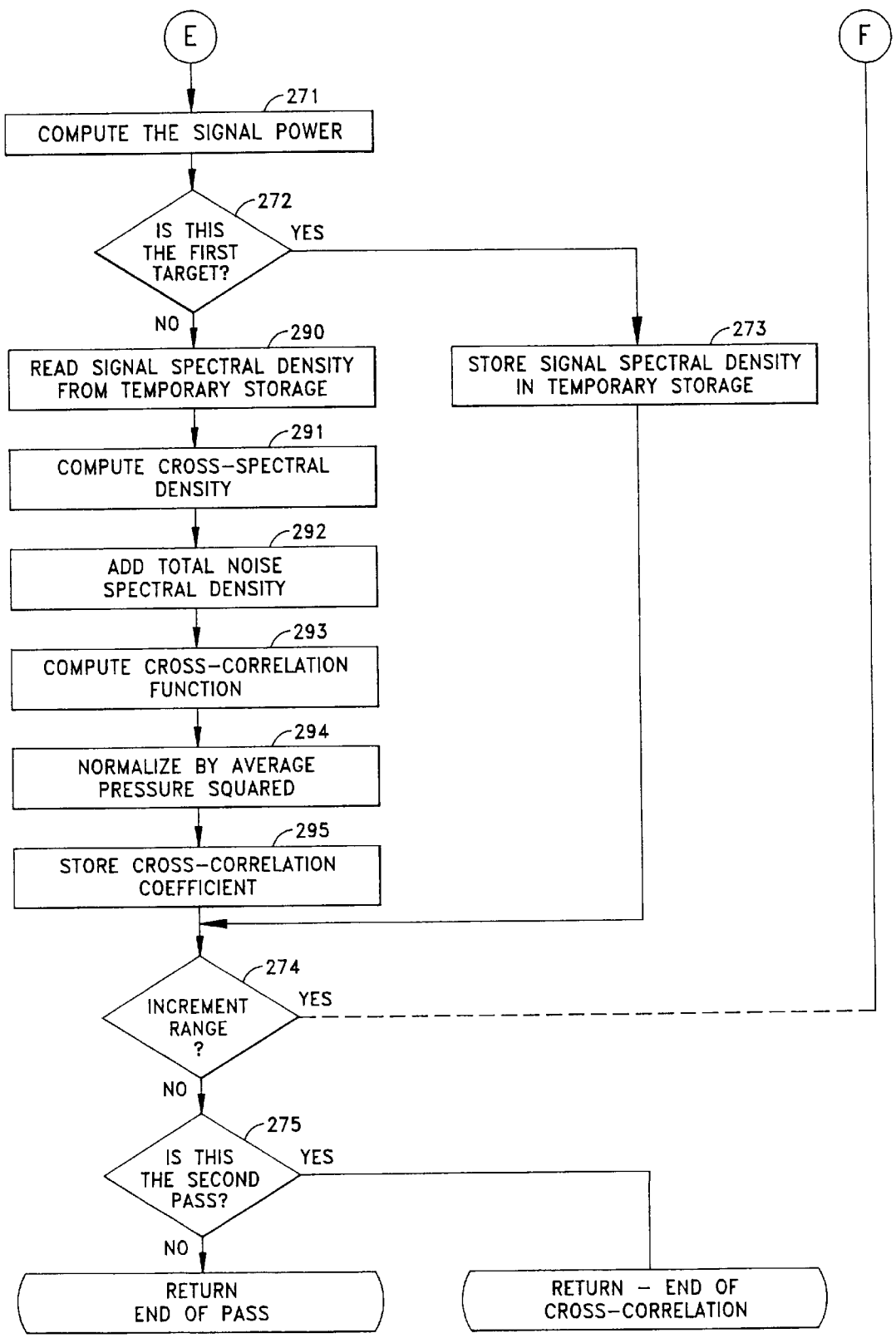
Figure 17:
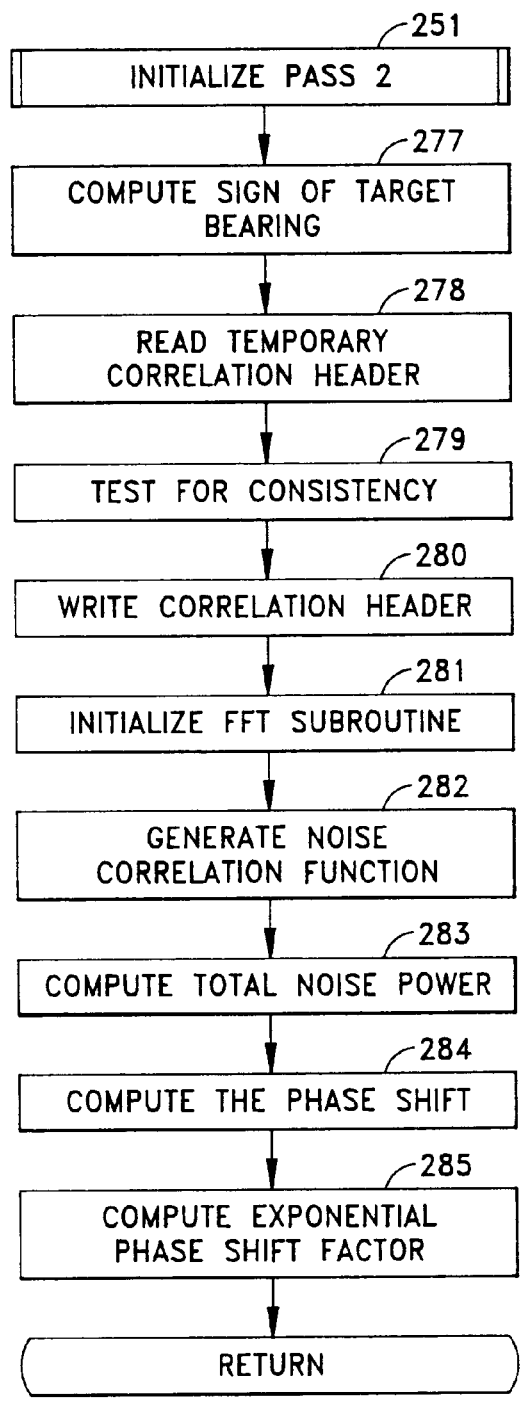
FIG. 17 is a flow diagram of another step in the process of FIG. 15B.

The range loop procedure 254 depicted in FIGS. 16A and 16B commences with step 261 to compute the actual target-receiver range for a selected first or second target at various time intervals. Step 262 initializes a signal spectral density for each time interval, and step 263 enables the generate eigenray module 27 of FIG. 1 to implement steps 90 through 95 of FIG. 5.

Step 264 incorporates a procedure that enables the generate eigenray module 27 of FIG. 1 to implement steps 96 through 113 of FIGS. 6 and 7 thereby to select an eigenray with an appropriate range. Step 264 also determines whether additional eigenrays in the table for other ranges defined by step 261 need processing.

If additional processing is required, step 264 diverts to step 265 that computes the transmitter and receiver beam patterns. Step 266 adds the beam patterns, and step 267 uses coherent addition to combine the eigenrays at the current range. Control then passes back to step 264.

When no eigenray processing is necessary, step 264 diverts to step 268 to compute the signal spectral density. Step 270 adds the source level and filter equalizer, respectively.

After step 270, control transfers to step 271 of FIG. 16B that computes the signal power for the specified range. Step 272 then determines whether the pass through the range loop is for a first or second target. If a second target has not been accounted for, the spectral density is stored in a temporary storage file by step 273, and control passes to steps 274 and 275. For the first pass the increment range step 274 determines whether any ranges for a first target remain. If so, step 274 transfers control to step 261 of FIG. 16A to call the next range. Otherwise step 275 determines if this is a second pass. If it is a first pass, step 275 returns control to step 250 of FIG. 15B for the second pass.

The second pass follows the steps 230 through 240 in FIG. 15A for the second target as described above with respect to the first target. However, step 250 enables a procedure 251 to initialize the second pass shown in FIG. 17 prior to enablement of step 254 in FIG. 15B. These steps include computing the sign of the second target bearing in step 277, recalling the temporary correlation header from step 253 (FIG. 15B) in step 278 of FIG. 17 and testing the consistency between the first and second targets in step 279. Step 280 writes a correlation header and step 281 initializes the fast Fourier transform sub-module. Step 282 generates a noise correlation function, $totnse_v(frq)$, while steps 283 through 285 compute a total noise power, a phase shift and exponential phase shift factor, respectively.

The range loop portion 254 commencing with step 261 of FIG. 16A is then implemented and the process proceeds in sequence to step 272 of FIG. 16B as described above except using the simulated and computed data for the second target. Step 272 in this instance enables step 290 to read the spectral density stored by step 273 and then step 291 computes the cross-spectral density. Step 292 adds in the spectral noise density "$sp^2_{nse}(frq)$" as a function of the frequencies to yield a total spectral density. Step 293 computes a cross-correlation function for the cross-spectral density ($crl_f(\tau)$) as follows:

$$crl_f(\tau) = 2\Re\left[\int_{frq_{min}}^{frq_{max}} sp^2_{tot}(frq)e^{(2\pi i frq \tau)}\, d\, rfq\right] \quad (31)$$

$$sp^2_{tot}(frq) = \quad (32)$$
$$spcsgn(frq, 1)spcsgn(frq, 2) + e\left(\frac{-arysep(frq)}{crldst}sp^2_{nse}(frq)\right)$$

$$sp^2_{nse}(frq) = [totnse_v(frq)]^2 \quad (33)$$

where $\Re$ is the real component, "trldst" is the noise correlation distance, "arysep" is the array separation and "$totnse_v$" is the total noise spectrum. For j=1,2, the terms "spcsgn(frq,j)" that represent the complex valued spectral densities are generated at $rng_v$ where:

$$rngg = \sqrt{\{rng_v^2 + .25arysep^2 - rng_v arysep \sin(itrgbrn_i)\}} \quad (34)$$

where $trgbrn_c$ is the target bearing angle in radians and $rng_v$ denotes ranges from the target to the point halfway between the receivers, the + sign is chosen when j=1, and the − sign when j=2. The $rng_v$ may be different from the primary eigenray ranges.

Step 294 in FIG. 16B then normalizes the cross-correlations by the average pressure squared. That is, $$crl_c(\tau) = \frac{crl_f(\tau)}{\sqrt{(prs_{11}prs_{22})}} \quad (35)$$

where $$prs_{jj} = 2\int_{frq_{min}}^{frq_{max}}\{|spcsgn(frq, j)|^2 + sp^2_{nse}(frq)\}\, d\, frq \quad (36)$$

and $prs_{jj}$ collectively are the channel pressures squared.

Step 295 then stores the cross-correlation coefficient for each time delay and transfers control to step 274 for final processing as previously described. When all the ranges have been processed and determined that the second pass is complete, control returns to step 76 of FIG. 4.

The cross-correlation sub-module 14C uses the discrete inverse Fourier transform $$crl(\tau) = 2(frq_{max} - frq_{min}) \quad (37)$$
$$\mathcal{R}\left[\exp(2\pi i frq_{min}\tau)\frac{1}{nfft}\sum_{frq=frq_{min}}^{frq_{max}} sp_{tot}^2 \exp\{2\pi i(frq - frq_{min})\tau\}\right]$$

evaluated by a Markel FFT algorithm. The required $prs_{jj}$ terms are preferably found using the following equation:

$$prs_{jj} = 2\sum_{frq=frq_{min}}^{frq_{max}} \left\{|spcsgn(frq, j)|^2\right\} + sp_{nse}^2(frq)\bigg| d\,elfrq \quad (38)$$

In this instance the minimum and maximum frequencies, $frq_{min}$ and $frq_{max}$, are required input data to the processing module 14 of FIG. 1 while the frequency increment "frqdel" is given by:

$$frqdel = \frac{(frq_{max} - frq_{min})}{nfft} \quad (39)$$

where nfft is the size of the FFT. The corresponding delay time parameters used in Markel FFT algorithm, maxtim, taumin, taudel and taumax are given by:

maxtim=nfft taumin=0.0 taudel=1.0/(frq$_{max}$-frq$_{min}$)

taumax=(maxtim−1)* taudel that are dependent upon the frequency parameters.

Figure 18A:
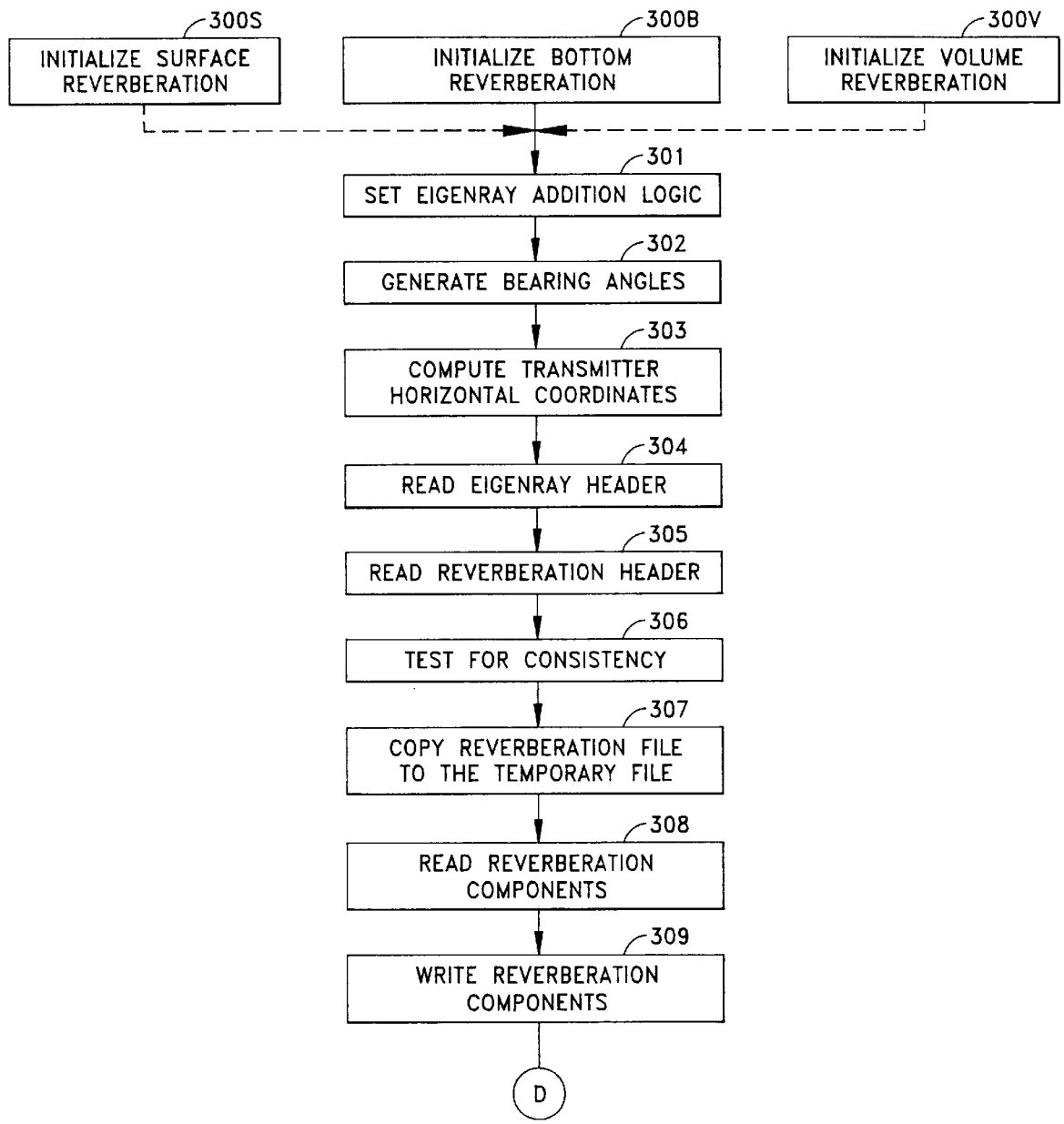
FIGS. 18A through 18D constitute a reverberation module flow diagram of FIG. 1.

The reverberation module 14D responds to an appropriate instruction set and comprises a plurality of processes or steps that commence with steps 300S, 300B or 300V of FIG. 18A upon enablement by the step 76 of FIG. 4. Surface reverberation, bottom reverberation, and volume reverberation initial conditions are initialized in steps 300S, 300B and 300V respectively. Monostatic reverberation refers to the instance wherein the acoustic source and receiver are collocated. In calculating a simulated monostatic reverberation, the reverberation module 14D begins generally by resetting and storing a temporary reverberation file, computing primary eigenrays at primary ranges and frequencies, sorting the primary eigenrays according to range and then computing the monostatic reverberation prior to displaying the monostatic reverberation in a desired format.

The reverberation module 14D of the processing module 14 of FIG. 1 simulates the scattering of acoustic pressure waves as the waves are subjected to surface, bottom and volume reverberation.

The steps of computing the primary eigenrays and sorting the eigenrays and computing the monostatic reverberation are performed to simulate surface, bottom and volume reverberation. The reverberation module 14D essentially operates by dividing the simulated volume into several regions with the contribution of each of the regions and the surface and bottom reverberation being added together as a function of the reverberation pressure squared at discrete time intervals. This function is then stored versus time at constant frequency.

The reverberation module 14D operates on the premise that portions of an acoustic signal from a source received at a remote location after transmission through the ocean in a multipath sonar system back scatters as the acoustic signal passes through various regions of the ocean and encounters the ocean surface and bottom. In the reverberation module 14D the term "rnge" is the range from the source to the scatterer and the term "trgdpt" is the target's depth, both of these terms are generally given in kilometers. Eigenrays that join the source, (in this instance an active sonar source), to the target as a function of the terms rng and trgdpt are obtained from an eigenray file sorted according to range.

There are many types of acoustic scatterers. General area scattering is attributed to bubbles, sea surface roughness and density discontinuities. Volume scattering can be caused by biological organisms and density discontinuities. Bottom scattering is caused by sea floor roughness.

Now referring to FIG. 18A, step 301 sets the eigenray addition logic and step 302 generates bearing angles. Step 303 computes the horizontal coordinates for the transmitter. Steps 304 and 305 read the eigenray header and the reverberation headers, respectively, and step 306 tests for consistency between the eigenray headers and the reverberation headers.

Step 307 copies the reverberation file to a temporary file and step 308 reads the reverberation components from the simulated data. After step 309 writes the various reverberation components, control transfers to step 310 in FIG. 18B that reads and tests the temporary reverberation file header stored by step 307 and then makes any necessary changes. Step 311 rewrites the reverberation header after testing by step 310. Steps 312 through 315 compute the range and time increments, the filter equalizers, the source levels and the horizontal beam widths, respectively. Step 316 processes each frequency.

Figure 18B:
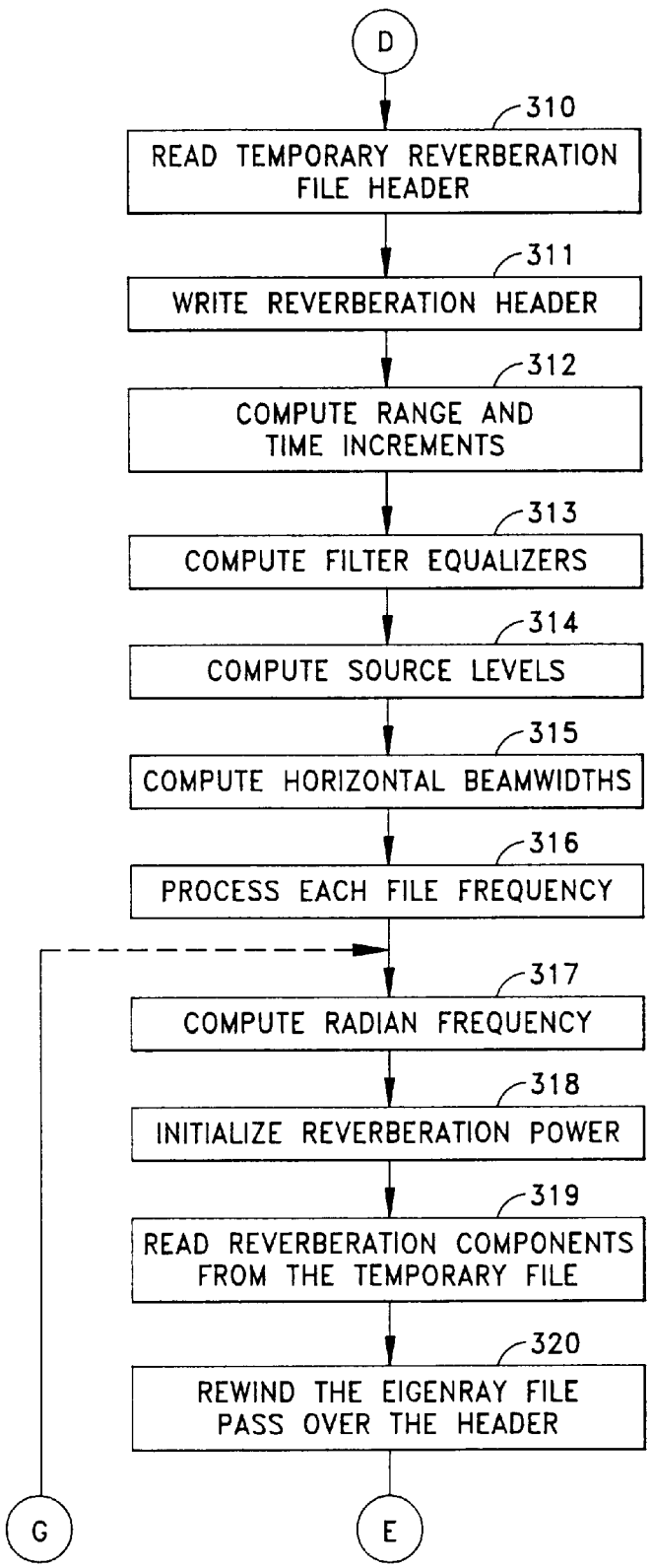
Figure 18C:
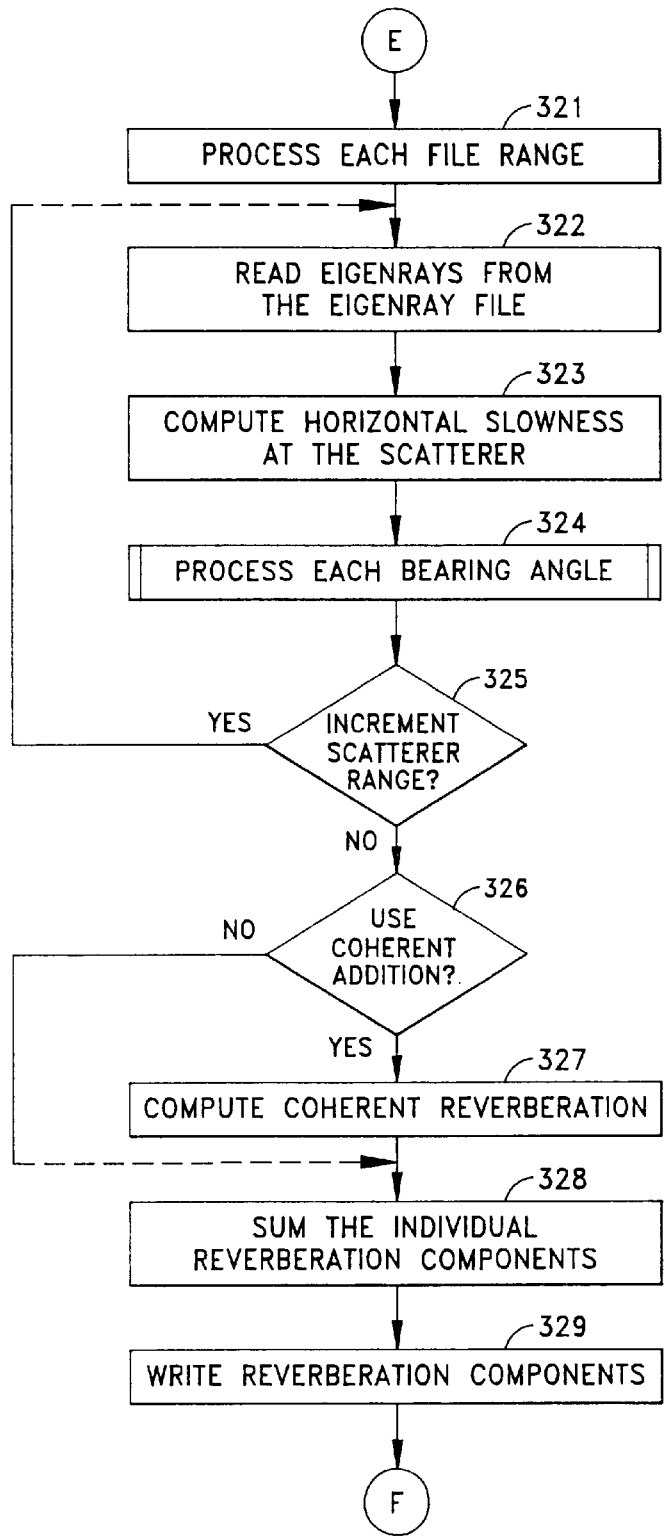
Figure 18D:
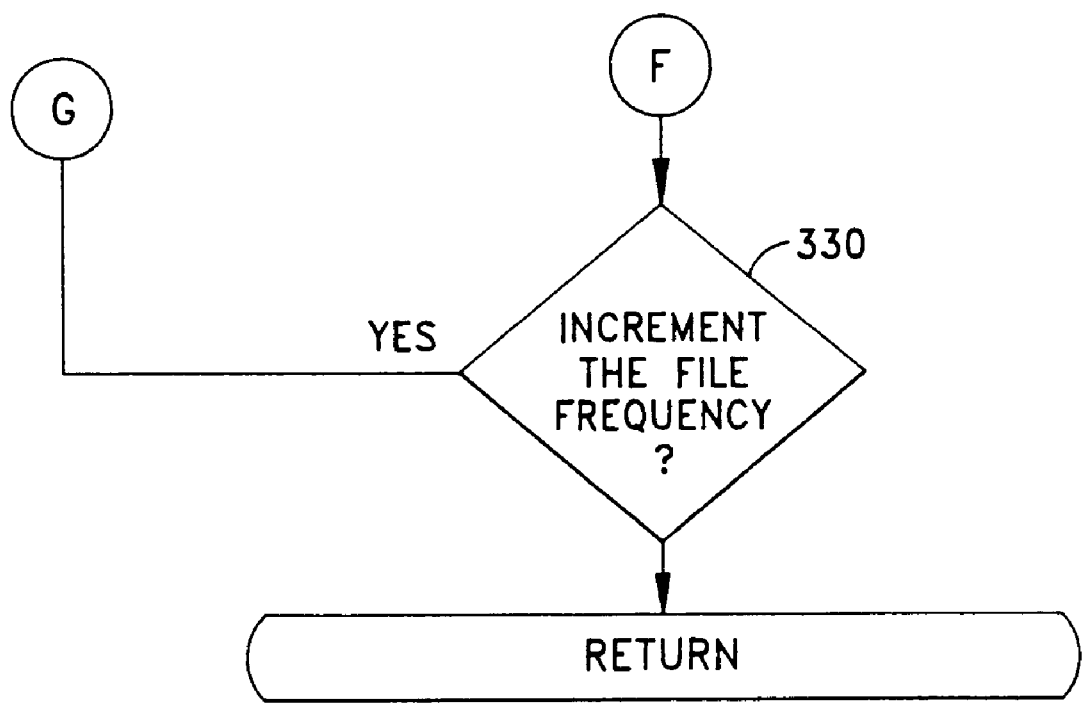

Next the system enters a loop spanning FIGS. 18B, 18C and 18D. In FIG. 18B, the first step in the loop, step 317 computes the radian frequency for a selected frequency. Step 318 then initializes the reverberation power, and step 319 reads the reverberation components from the temporary file. Step 320 rewinds the eigenray file and passes over the header. Step 321 in FIG. 18C processes each file range with step 322 then reading the previously computed eigenrays from the eigenray file. Step 323 computes the horizontal slowness of the traveling waves at the scatterer according to:

$$hrzslw_v(ieig) = \frac{\cos\{trgang(ieig)\}}{trgsspe} \quad (40)$$

for each of the eigenrays (ieig) where the term "trgsspe" is the target sound speed which is in a rough approximation in range dependent environments.

After processing each bearing angle in a procedure 324, step 325 determines whether the scattering range needs incrementing, and if so, returns to step 322. Otherwise, step 326 is enabled. Step 326 determines whether the operator has determined to include coherent addition. If so, step 327 computes the coherent reverberation. After computation of the coherent reverberation in step 327 or after determining in step 326 that coherent addition is not needed, step 328 sums the individual reverberation components and writes the reverberation components to the file in step 329. Step 330 in FIG. 18D, as a loop control, determines whether there are additional frequencies to be determined. If so, control returns to step 317 in FIG. 18B to compute the next frequency.

Figure 19A:
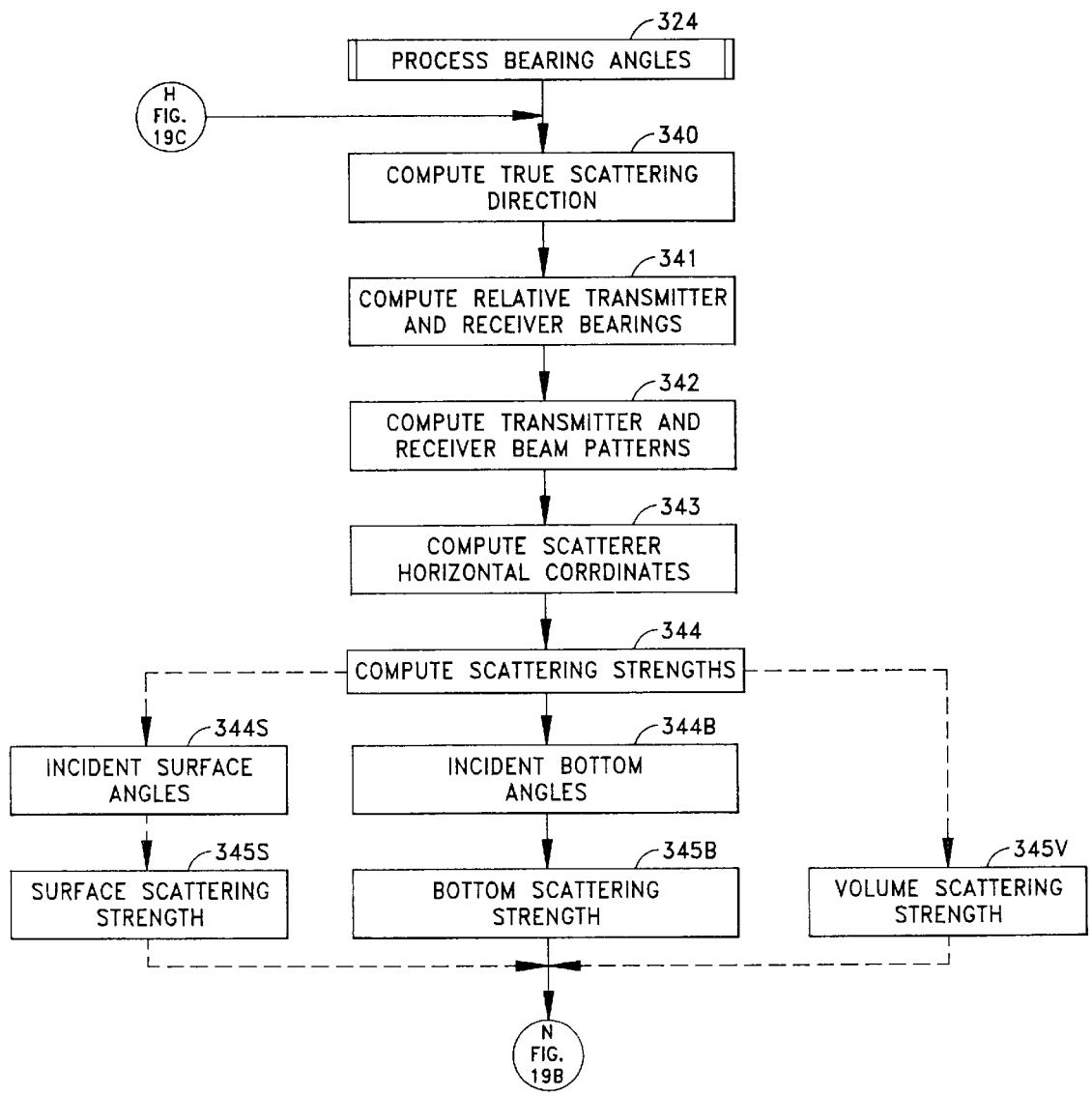
FIGS. 19A through 19C are flow diagrams of a step in the process of FIG. 18C.
Figure 19B:
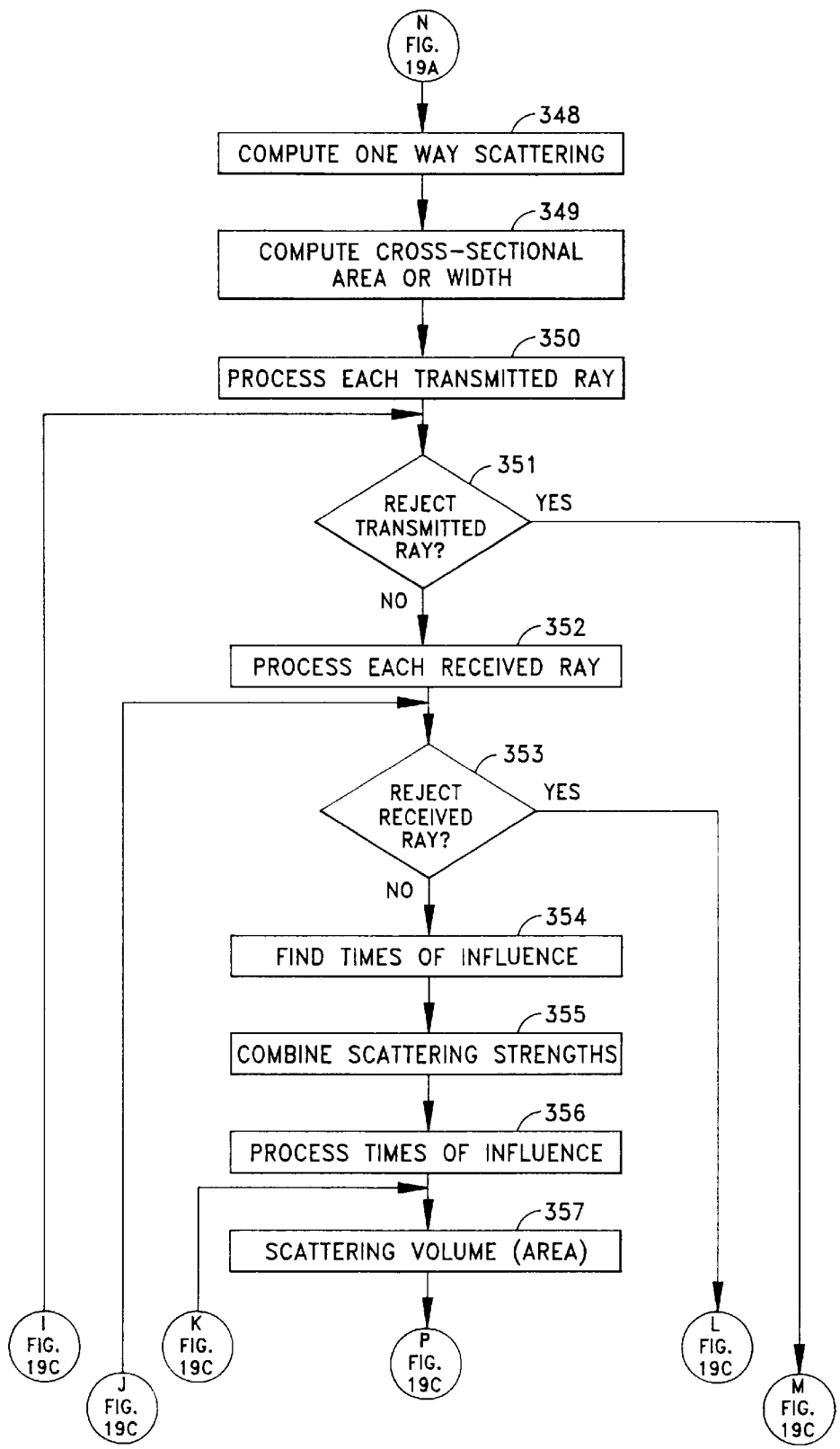
Figure 19C:
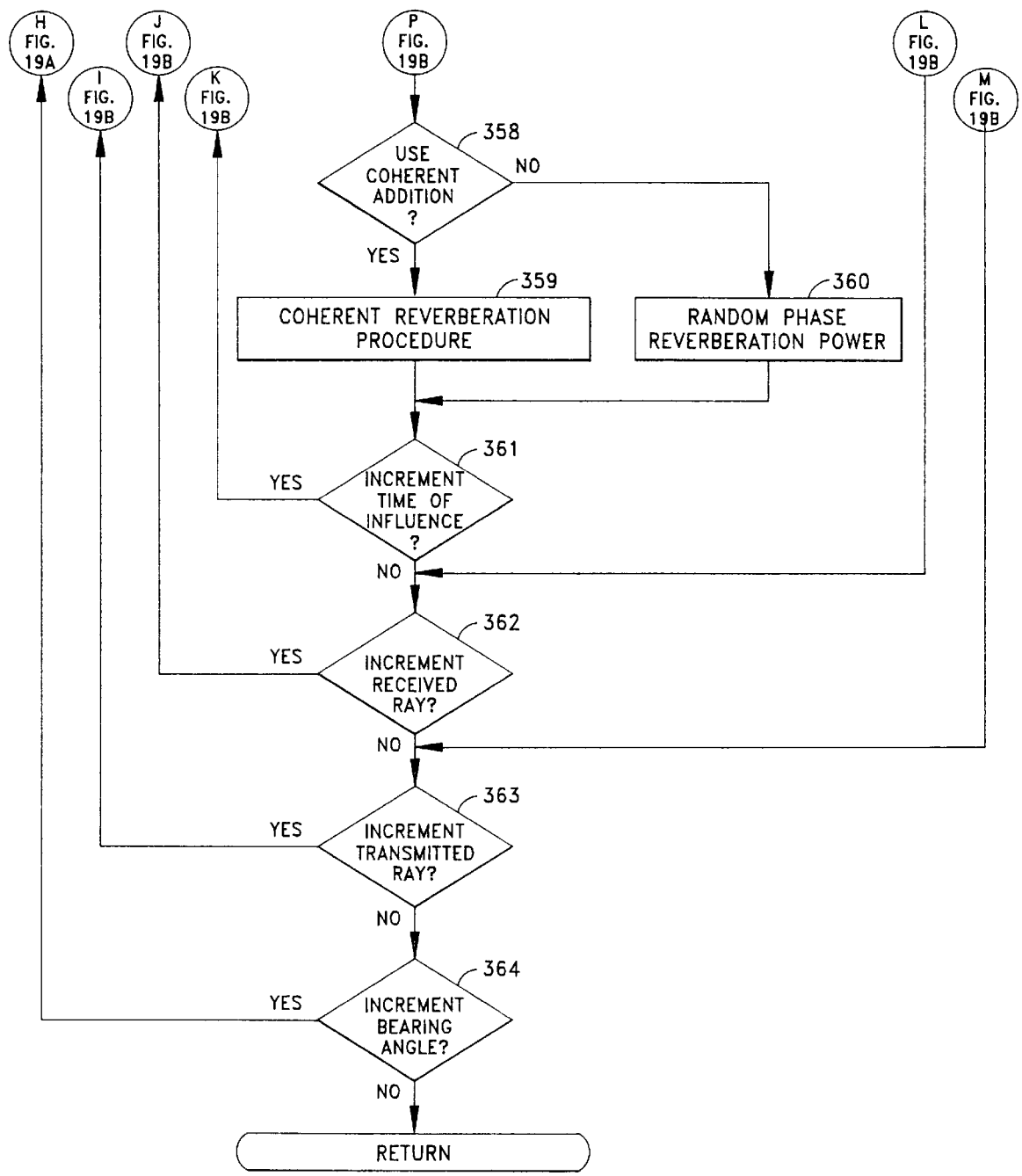

The procedure 324 in FIG. 18C for processing each bearing angle in step 324 comprises a plurality of steps depicted in FIGS. 19A, 19B and 19C. The processing of each bearing angle commences by computing the true scattering direction, the relative transmitter and receiver bearings, transmitter and receiver mean patterns, and the horizontal coordinates of the scatterer in steps 340 through 343, respectively.

The true target bearing, "trgbrn$_t$," and the scatterers are offset from the target by a bearing angle "brn$_v$" so that the true bearing angle in radians to the scatter, sctbrn, is given by:

$$\text{sctbrn} = \text{trgbrn}_t + \text{brn}_v \tag{41}$$

If the transmitter is aimed in the true transmitter heading "trnhdg$_i$", the relative transmitter heading, trnrel, will be:

$$\text{trnrel} = \text{sctbrn} - \text{trnhdg}_i \tag{42}$$

while the relative receiver heading, rcvrel, will be:

$$\text{rcvrel} = \text{sctbrn} - \text{rcvhdg}_i \tag{43}$$

Thus for each value of the term rnge the horizontal co-ordinates of the scatterer, xsct and ysct, are:

$$\text{xsct} = \text{xtrn} + \text{rnge} \cos(\text{sctbrn}) \tag{44}$$

$$\text{ysct} = \text{ytrn} + \text{rnge} * \sin(\text{sctbrn}) \tag{45}$$

Where xtrn and ytrn are the horizontal coordinates of the target.

Step 344 computes the scattering strength for surface, bottom and volume scattering. Specifically the step 344 includes step 344S and 344B for respectively determining the incident surface angles and the incident bottom angles and the steps 345S, 345B and 345V determine the surface scattering strength, bottom scattering strength, and volume scattering strength, respectively. The horizontal co-ordinates of the scatterer are then used to compute the scattering strength roots "str":

$$\text{str}_s = \text{srfstr}_v(\text{xsct}, \text{ysct}, \text{srfang} - \text{trgang}(\text{ieig}), \text{frq}) \tag{46}$$

for the surface reverberation and:

$$\text{str}_b = \text{btmstr}_v(\text{xsct}, \text{ysct}, \text{trgang}(\text{ieig}) - \text{btmang}, \text{frq}) \tag{47}$$

For the bottom reverberation, while the volume reverberation is found by the following:

$$\text{str}_v = \text{VLMSTR}_v(\text{xsct}, \text{ysct}, \text{trgdpt}, \text{frq}) \tag{48}$$

The transmitter and scattering strength roots are given thereby by the following equations:

$$\text{trnstr}(\text{ieig}) = \text{str}[\text{SRCLVL}_v(\text{frq})\text{ampeig}(\text{ieig})\text{TRNBMP}_v(\text{trnrel}, \text{srcang}(\text{ieig}), \text{frq})]^2 \tag{49}$$

$$\text{rcvstr}(\text{ieig}) = \text{str}[\text{FLTEQL}_v(\text{frq})\text{ampeig}(\text{ieig})\text{RCVBMP}_v(\text{rcvrel}, \text{srcang}(\text{ieig}), \text{frq})]^2 \tag{50}$$

which are computed for each of the eigenrays, where the terms frq=frequency (hz)
sctbrn=true scatterer bearing (rad)
srcang=vertical angle (rad) at the source
trgang=vertical angel (rad) at the target
timeig=travel time of the eigenray (s)
rngrfr=range (km) at which the relative pressure is referenced ampeig=eigenray amplitude (pressure ratio for each rngrfr)
SRFSTR$_v$=the surface scattering strength root (1/km)
BTMSTR$_v$=the bottom scattering strength root (1/km)
VLMSTR$_v$=the volume scattering strength root (1/km$^{1.5}$)
TRNBMP$_v$=the transmitter beam pattern (pressure ratio)
RCVBMP$_v$=the receiver beam pattern (voltage ratio)
SRCLVL$_v$=the source level
   ($\mu$Pa for each value rngrfr for narrow band)
   ($\mu$Pa/Hz for each value rngrfr for broad band) and
FLTEQL$_v$=determines the filter equalizer (voltage ratio)

Once the scattering strengths for the surface, bottom and volume are determined, the process continues in FIG. 19B by computing the one way scattering strength and the cross-sectional area or width in steps 348 and 349. Step 350 then processes each transmitted ray and step 352 processes each received ray. Steps 351 and 353 determine whether to accept the transmitted and received rays respectively based upon known attributes. If the transmitted rays are accepted, step 354 calculates the time interval that the reverberation affects the receiver. Step 355 then determines the scattering strengths of the reverberation signals with step 356 processing the times of effect.

That is, these steps compute the time "timtot" representing the time required for the signal to reach, timeig (itrans), and return, timeig (irecvr), along the eigenrays having indexes "itrans" and "irecvr", respectively, according to:

$$\text{timtot} = \text{timeig}(\text{itrans}) + \text{timeig}(\text{irecvr}) \tag{51}$$

with the corresponding boundary reverberation per unit scattering region given by:

$$\text{strtot} = \text{trnstr}(\text{itrans})\text{rcvstr}(\text{irecvr}) \tag{52}$$

Thus if the range for the eigenrays "itrans" and "irecvr" are not equal and are interchanged, the orientation of the model is changed but the total travel time remains "timtot". The contribution of each eigenray is added to the original total travel time.

This eliminates the need to retain eigenray pairs for which the term "itrans" is greater than the term "irecvr". For the volume reverberation term, strtot$_v$, requires an additional multiplication by the strength term, str. Under this model the scattering region is bounded to the left and right by curves of constant total travel time, tmin and tmax, through:

$$\text{rnge} - \frac{\text{rngdel}}{2} \tag{53}$$

and $$\text{rnge} + \frac{\text{rngdel}}{2} \tag{54}$$

respectively. These total travel times are found by using linear extrapolation where:

$$\frac{dt}{dr} = \text{hrzslw}_v(\text{itrans}) + \text{hrzslw}_v(\text{irecvr}) \tag{55}$$

$$\text{tmin} = \text{timtot} - \frac{\text{rngdel}}{2} * \frac{dt}{dr} \tag{56}$$

and $$tmax = timtot + \frac{rngdel}{2} * \frac{dt}{dr} \quad (57)$$

The reverberation received at time, tim, is due to scatterers whose total travel time falls within the interval (tim−plslng, tim) where tim is the scattering signal time, time(s) and plslng is the scattering signal pulse length. When "tmin" and "tmax" both lie within (tim−plslng,tim), the scattering volume, vlmdel, is:

$$vlmdel = HBMWTH_v(frq)*rnge*rngdel*dptdel \quad (58)$$

where dptdel=scattering layer thickness in kilometers; and $HBMWTH_y$=the horizontal beamwidth in radians The term dptdel is omitted from equation (58) in surface and bottom computations. If tmin or tmax is outside the interval (tim−plslng,tim), the scattering volume is reduced according to the equations:

$$tl = max(tmin, tim-plslng) \quad (59)$$

and $$tr = min(tmax, tim) \quad (60)$$

so:

$$vlmdel = vlmdel * \frac{(tr - tl)}{(tmax - tmin)} \quad (61)$$

Step 357 in FIG. 19B then determines the volume of the simulated area and step 358 in FIG. 19C determines whether coherent addition is needed with step 359 determining the coherent reverberation pressure. If coherent addition is not needed, step 360 determines the random phase reverberation power.

The contribution to reverberation from this eigenray pair and range region is added to the reverberation of similar type from other eigenray pairs and range regions. That is:

$$rvb(itim, irvb) = \sum_{img=1}^{nmg} \sum_{itrans=1}^{neig} \sum_{irecvr=itrans}^{neig} strtot * vlmdel \quad (62)$$

where irvb=1 for surface reverberation
=2 for bottom reverberation
=3 for volume reverberation In addition to individual components, the reverberation models also determine the total reverberation pressure squared according to:

$$rvb(itim, 5) = \sum_{irvb=1}^{4} rvb(itim, irvb) \quad (63)$$

where (irvb=4 corresponds to fathometer returns)

Step 361 in FIG. 19C then determines whether a time of effect needs incrementing. If so, control branches back to step 357 in FIG. 19B. Otherwise step 362 determines whether the received ray needs incrementing, and if so, enables step 353. It should be noted that step 362 is enabled after step 353 when a received ray is rejected. Once all received rays have been incremented step 362 enables step 363 to determine whether the transmitted array needs incrementing. Step 363 is also enabled after rejection of the transmitted ray by step 351. When the transmitted ray is incremented, step 363 enables step 351. Otherwise step 364 determines whether the bearing angle needs incrementing. If the angle is incremented, step 340 of FIG. 19A is enabled, and if not, step 325 of FIG. 18C is enabled.

It will now be understood that the foregoing invention includes methods and apparatus for producing one or more output signals and reports simulating the output of a multi-path sonar system. In particular, the method and apparatus operates on simulated sonar system parameters by generating eigenrays having terms that correspond with ones of the simulated parameters and then convolving or otherwise combining the eigenrays with the parameters to provide one or more of the output signals: lofargrams, autocorrelation coefficients, cross-correlation coefficients, and reverberation.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An apparatus for simulating a lofargram of a multi-path sonar system comprising:

input means for providing simulated sonar system parameter signals;

defining means for establishing a plurality of eigenrays from the simulated sonar system parameter signals; and lofargram means responsive to said simulated sonar system parameter signals for interpolating said eigenrays to produce simulated lofargram output signals.

2. An apparatus as recited in claim 1 further comprising report means for generating a report responsive to said output signal corresponding to the simulated lofargram.

3. An apparatus as recited in claim 2 wherein said lofargram means includes:

means for computing a closest approach of a simulated target and associated time interval from said simulated sonar system parameters; and means for processing said defined eigenrays for time intervals prior to said computed closest approach and for time intervals after said computed closest approach.

4. An apparatus as recited in claim 2 wherein said defining means includes generating means for generating eigenrays by fast multi-path expansion.

5. An apparatus as recited in claim 4 wherein said lofargram means interpolates said eigenrays having parameter terms corresponding with said simulated sonar system parameter signals.

6. An apparatus as recited in claim 1 wherein said lofargram means interpolates said eigenrays having parameter terms corresponding with said simulated sonar system parameter signals.

7. An apparatus as recited in claim 6 wherein said lofargram means includes:

means for computing a closest approach of a simulated target and associated time interval from said simulated sonar system parameters; and means for processing said defined eigenrays for time intervals prior to said computed closest approach and for time intervals after said computed closest approach.

8. An apparatus as recited in claim 1 wherein said defining means includes generating means producing eigenrays by fast multi-path expansion.

9. A method for simulating a lofargram of a multi-path sonar system comprising the steps of:

inputting simulated sonar system parameters;

defining eigenrays with terms corresponding with the simulated sonar system parameters; and interpolating the eigenrays with the simulated sonar system parameters to produce output signals corresponding to lofargram signals of the sonar system.

10. A method as recited in claim 9 further comprising the step of producing a report from the output signals.

11. A method as recited in claim 10 wherein said defining step includes the steps of:

producing a plurality of eigenrays; and sorting the plurality of eigenrays to define the eigenrays with the corresponding terms.

12. A method as recited in claim 11 wherein:

said inputting step includes inputting time and range parameters; and said interpolating step includes determining a closest approach range and associated time interval for a target.

13. A method as recited in claim 12 wherein said interpolating step includes processing the eigenrays at time intervals sequentially before the closest approach range and after the closest approach range.

14. A method as recited in claim 9 wherein:

said inputting step includes inputting time and range parameters; and said interpolating step includes determining a closest approach range and associated time interval for a target.

15. A method as recited in claim 14 wherein said interpolating step includes processing the eigenrays at time intervals sequentially before the closest approach range and after the closest approach range.

16. A method as recited in claim 15 wherein said defining step includes the steps of:

producing a plurality of eigenrays; and sorting the plurality of eigenrays to define the eigenrays with the corresponding terms.

17. A method as recited in claim 15 further comprising the step of producing a report from the output signals.

18. A method as recited in claim 9 wherein said defining step includes the steps of:

producing a plurality of eigenrays; and sorting the plurality of eigenrays to define the eigenrays with the corresponding terms.

* * * * *